US012784660B2

(12) United States Patent
Shim et al.

(10) Patent No.: US 12,784,660 B2
(45) Date of Patent: Nov. 3, 2026

(54) PIXEL OF A DISPLAY DEVICE, DISPLAY DEVICE AND ELECTRONIC DEVICE

(71) Applicant: SAMSUNG DISPLAY CO., LTD., Yongin-si (KR)

(72) Inventors: Jongsik Shim, Yongin-si (KR); Ahyoung Kim, Yongin-si (KR); Chanyoung Yang, Yongin-si (KR); Seongkyu Lee, Yongin-si (KR)

(73) Assignee: SAMSUNG DISPLAY CO., LTD., Yongin-si (KR)

( * ) Notice: Subject to any disclaimer, the term of this patent is extended or adjusted under 35 U.S.C. 154(b) by 0 days.

(21) Appl. No.: 19/198,302

(22) Filed: May 5, 2025

(65) Prior Publication Data

US 2026/0120622 A1 Apr. 30, 2026

(30) Foreign Application Priority Data

Oct. 31, 2024 (KR) ........................ 10-2024-0152977

(51) Int. Cl.
*G09G 3/32* (2016.01)

(52) U.S. Cl.
CPC ......... *G09G 3/32* (2013.01); *G09G 2300/043* (2013.01); *G09G 2300/0819* (2013.01);
(Continued)

(58) Field of Classification Search
CPC ............. G09G 3/32; G09G 2320/0209; G09G 2320/0233; G09G 2320/0257
See application file for complete search history.

(56) References Cited

U.S. PATENT DOCUMENTS

2023/0029234 A1* 1/2023 Son ...................... G09G 3/3266
2023/0206855 A1* 6/2023 Park ..................... H10K 59/131
345/100

(Continued)

FOREIGN PATENT DOCUMENTS

KR 10-2022-0093905 A 7/2022
KR 10-2023-0009290 A 1/2023

(Continued)

OTHER PUBLICATIONS

European Search Report dated Oct. 28, 2025 from the European Patent Office for corresponding European Patent Application No. 25186912.9.

*Primary Examiner* — Lisa S Landis

(74) *Attorney, Agent, or Firm* — F. CHAU & ASSOCIATES, LLC

(57) ABSTRACT

A pixel of a display device includes a first transistor having a first gate connected to a first node, a first terminal receiving a first power supply voltage, and a second terminal connected to a second node. A first capacitor is connected between the first and second nodes. A second capacitor is connected between the first power supply voltage and the second node. A second transistor transfers a data voltage to the first node. A third transistor selectively connects the second node to an anode electrode of a light-emitting element based on a first emission signal. In a first mode, during data writing, the third transistor is turned off, and the first transistor generates an emission current independent of the capacitance of the light-emitting element. In a second mode, the third transistor is turned on, and the emission current depends on the capacitance of the light-emitting element.

20 Claims, 23 Drawing Sheets

(52) U.S. Cl.
CPC . *G09G 2310/08* (2013.01); *G09G 2320/0209* (2013.01); *G09G 2320/0233* (2013.01); *G09G 2320/0257* (2013.01); *G09G 2330/022* (2013.01)

(56) References Cited

U.S. PATENT DOCUMENTS

| | | | |
|---|---|---|---|
| 2024/0296789 | A1 | 9/2024 | Lee |
| 2024/0331616 | A1 | 10/2024 | Lim et al. |

FOREIGN PATENT DOCUMENTS

| | | | |
|---|---|---|---|
| KR | 10-2024-0060411 | A | 5/2024 |
| KR | 10-2024-0076030 | A | 5/2024 |
| KR | 10-2678891 | B1 | 6/2024 |

* cited by examiner

M2
(HIGH BRIGHTNESS MODE)

PIXEL OF A DISPLAY DEVICE, DISPLAY DEVICE AND ELECTRONIC DEVICE

CROSS-REFERENCE TO RELATED APPLICATION(S)

This patent application claims priority under 35 USC § 119 to Korean Patent Application No. 10-2024-0152977, filed on Oct. 31, 2024 in the Korean Intellectual Property Office (KIPO), the disclosure of which is incorporated by reference in its entirety herein.

1. TECHNICAL FIELD

Embodiments of the present inventive concept are directed to a display device, and more particularly to a pixel of a display device, the display device and an electronic device.

2. DISCUSSION OF RELATED ART

Modern display devices are electronic screens used to visually present information, images, or videos. These devices include technologies such as Liquid Crystal Display (LCD), Light Emitting Diode (LED), Organic LED (OLED), and MicroLED. Modern displays focus on high resolution, fast refresh rates, touch sensitivity, and thin, flexible form factors. A pixel (short for picture element) is the smallest unit of a digital image or display. In modern displays like LCD, OLED, or LED screens, a pixel is a tiny dot that can emit or control light to show a specific color.

The pixel may include a storage capacitor, a scan transistor that transfers a data voltage to the storage capacitor in response to a scan signal, a driving transistor that generates an emission current based on the data voltage stored in the storage capacitor, and a light-emitting element that emits light based on the emission current.

The driving transistor is typically implemented with a low-temperature polycrystalline silicon ("LTPS") transistor. However, to enhance image quality, pixels using oxide transistors for the driving transistor have been recently developed. While oxide transistors can enhance image quality, they exhibit greater current fluctuation in response to voltage fluctuations compared to the LTPS transistor. As a result, a luminance sensitivity of a pixel including the oxide transistor as the driving transistor may be higher than that a pixel including the LTPS transistor as the driving transistor.

SUMMARY

Some embodiments provide a pixel of a display device capable of enhancing or reducing a luminance sensitivity in response to voltage fluctuations, a display device including the pixel, and an electronic device including the display device.

According to embodiments, there is provided a pixel of a display device. The pixel includes a first transistor including a first gate connected to a first node, a first terminal configured to receive a first power supply voltage, and a second terminal connected to a second node, a first capacitor including a first electrode connected to the first node, and a second electrode connected to the second node, a second capacitor including a first electrode configured to receive the first power supply voltage, and a second electrode connected to the second node, a second transistor including a gate configured to receive a first gate signal, a first terminal connected to a data line, and a second terminal connected to the first node, a light-emitting element including an anode electrode, and a cathode electrode configured to receive a second power supply voltage, and a third transistor including a gate configured to receive a first emission signal, a first terminal connected to the second node, and a second terminal connected to the anode electrode, the third transistor configured to be turned off while the second transistor is turned on in a first mode, and to be turned on while the second transistor is turned on in a second mode.

In embodiments, during a data writing period of the first mode, the second electrode of the first capacitor may be connected to the second capacitor, and may be separated from the anode electrode. During a data writing period of the second mode, the second electrode of the first capacitor may be connected to the second capacitor and the anode electrode.

In embodiments, during an emission period of the first mode, the first transistor may generate an emission current based on a voltage independently of a capacitance of the light-emitting element. During an emission period of the second mode, the first transistor may generate an emission current based on a voltage stored in the first capacitor and dependent upon the capacitance.

In embodiments, with respect to a same data voltage, an emission current generated by the first transistor in the first mode may be less than an emission current generated by the first transistor in the second mode.

In embodiments, an emission current generated by the first transistor in the first mode may be determined by an equation $$\text{“}IEL = K\left[\frac{Chold}{Cst + Chold}(VDAT - VREF)\right]^2\text{”},$$

and an emission current generated by the first transistor in the second mode may be determined by an equation $$\text{“}IEL = K\left[\frac{Chold + Cel}{Cst + Chold + Cel}(VDAT - VREF)\right]^2\text{”},$$

where IEL is an emission current generated by the first transistor, K is a current coefficient, Cst is a capacitance of the first capacitor, Chold is a capacitance of the second capacitor, VDAT is a data voltage, VREF is a reference voltage, and Cel is a capacitance of the light-emitting element.

In embodiments, the first mode may be a normal mode and the second mode may be a high brightness mode.

In embodiments, the first transistor may be an N-type metal-oxide-semiconductor transistor.

In embodiments, the first transistor may further include a second gate connected to the second node.

In embodiments, the pixel may further include a fourth transistor including a gate configured to receive a second gate signal, a first terminal configured to receive a reference voltage, and a second terminal connected to the first node.

In embodiments, the pixel may further include a fifth transistor including a gate configured to receive a third gate signal, a first terminal configured to receive an initialization voltage, and a second terminal connected to the anode electrode.

In embodiments, the pixel may further include a sixth transistor including a gate configured to receive a second emission signal, a first terminal configured to receive the first power supply voltage, and a second terminal connected to the first terminal of the first transistor.

In embodiments, the first, second, third, fourth and fifth transistors may be N-type metal-oxide-semiconductor transistors, and the sixth transistor may be a P-type metal-oxide-semiconductor transistor.

In embodiments, the first, second, third, fourth, fifth and sixth transistors may be N-type metal-oxide-semiconductor transistors.

In embodiments, the first, second, fourth and fifth transistors may be N-type metal-oxide-semiconductor transistors, and the third and sixth transistors may be P-type metal-oxide-semiconductor transistors.

In embodiments, a frame period for the pixel of the display device may include an initialization period in which the first node and the second node are initialized, a compensation period in which a threshold voltage of the first transistor is stored in the first capacitor, a data writing period in which a data voltage is transferred to the first node, and an emission period in which the light-emitting element emits light.

In embodiments, in the first mode, the third transistor may be turned off in the compensation period and the data writing period, and may be turned on in the initialization period and the emission period. In the second mode, the third transistor may be turned off in the compensation period, and may be turned on in the initialization period, the data writing period and the emission period.

In embodiments, in the first mode, the third transistor may be turned off in the compensation period and the data writing period, and may be turned on in the initialization period and the emission period. In the second mode, the third transistor may be turned on in an entire period of the frame period.

In embodiments, in each of the first mode and the second mode, the fifth transistor may be turned off in the compensation period, the data writing period and the emission period, and may be turned on in the initialization period.

In embodiments, in the first mode, the fifth transistor may be turned off in the emission period, and may be turned on in the initialization period, the compensation period and the data writing period. In the second mode, the fifth transistor may be turned off in the compensation period, the data writing period and the emission period, and may be turned on in the initialization period.

In embodiments, the frame period may further include an anode initialization period in which the anode electrode is initialized.

In embodiments, in each of the first mode and the second mode, the anode initialization period may be between the data writing period and the emission period.

In embodiments, in the first mode, the anode initialization period may overlap the compensation period and the data writing period. In the second mode, the anode initialization period may be between the data writing period and the emission period.

According to embodiments, there is provided a display device including a display panel including a plurality of pixels, a data driver configured to provide a data voltage to each of the plurality of pixels, a scan driver configured to provide a first gate signal to each of the plurality of pixels, an emission driver configured to provide a first emission signal to each of the plurality of pixels, and a controller configured to receive a mode signal, and to control the data driver, the scan driver and the emission driver. Each of the plurality of pixels includes a first transistor including a first gate connected to a first node, a first terminal configured to receive a first power supply voltage, and a second terminal connected to a second node, a first capacitor including a first electrode connected to the first node, and a second electrode connected to the second node, a second capacitor including a first electrode configured to receive the first power supply voltage, and a second electrode connected to the second node, a second transistor including a gate configured to receive the first gate signal, a first terminal connected to a data line, and a second terminal connected to the first node, a light-emitting element including an anode electrode, and a cathode electrode configured to receive a second power supply voltage, and a third transistor including a gate configured to receive the first emission signal, a first terminal connected to the second node, and a second terminal connected to the anode electrode. When the mode signal indicates a first mode, the third transistor is turned off while the data voltage is applied to the first node through the data line and the second transistor. When the mode signal indicates a second mode, the third transistor is turned on while the data voltage is applied to the first node through the data line and the second transistor.

According to embodiments, there is provided an electronic device including a processor configured to provide input image data and a mode signal, and a display device including a plurality of pixels, the display device configured to receive the input image data and the mode signal, and to drive the plurality of pixels based on the input image data and the mode signal. Each of the plurality of pixels includes a first transistor including a first gate connected to a first node, a first terminal configured to receive a first power supply voltage, and a second terminal connected to a second node, a first capacitor including a first electrode connected to the first node, and a second electrode connected to the second node, a second capacitor including a first electrode configured to receive the first power supply voltage, and a second electrode connected to the second node, a second transistor including a gate configured to receive a first gate signal, a first terminal connected to a data line, and a second terminal connected to the first node, a light-emitting element including an anode electrode, and a cathode electrode configured to receive a second power supply voltage, and a third transistor including a gate configured to receive a first emission signal, a first terminal connected to the second node, and a second terminal connected to the anode electrode. When the mode signal indicates a first mode, the third transistor is turned off while the data voltage is applied to the first node through the data line and the second transistor. When the mode signal indicates a second mode, the third transistor is turned on while the data voltage is applied to the first node through the data line and the second transistor.

As described above, in a pixel of a display device, the display device and an electronic device according to embodiments, a third transistor (e.g., an emission path switch) connected between a second capacitor (e.g., a hold capacitor) and an anode electrode may be turned off when a data voltage is provided to the pixel in a first mode (e.g., a normal mode), and may be turned on when the data voltage is provided to the pixel in a second mode (e.g., a high brightness mode ("HBM")). Thus, in the second mode, not only the second capacitor but also a capacitance of a light-emitting element may be used, and a capacitance of the second capacitor may be reduced compared with a conventional pixel. Accordingly, a luminance sensitivity according to a voltage variation (or a voltage fluctuation) may be enhanced or reduced.

BRIEF DESCRIPTION OF THE DRAWINGS

Illustrative, non-limiting embodiments will be more clearly understood from the following detailed description in conjunction with the accompanying drawings.

DETAILED DESCRIPTION

Figure 1:
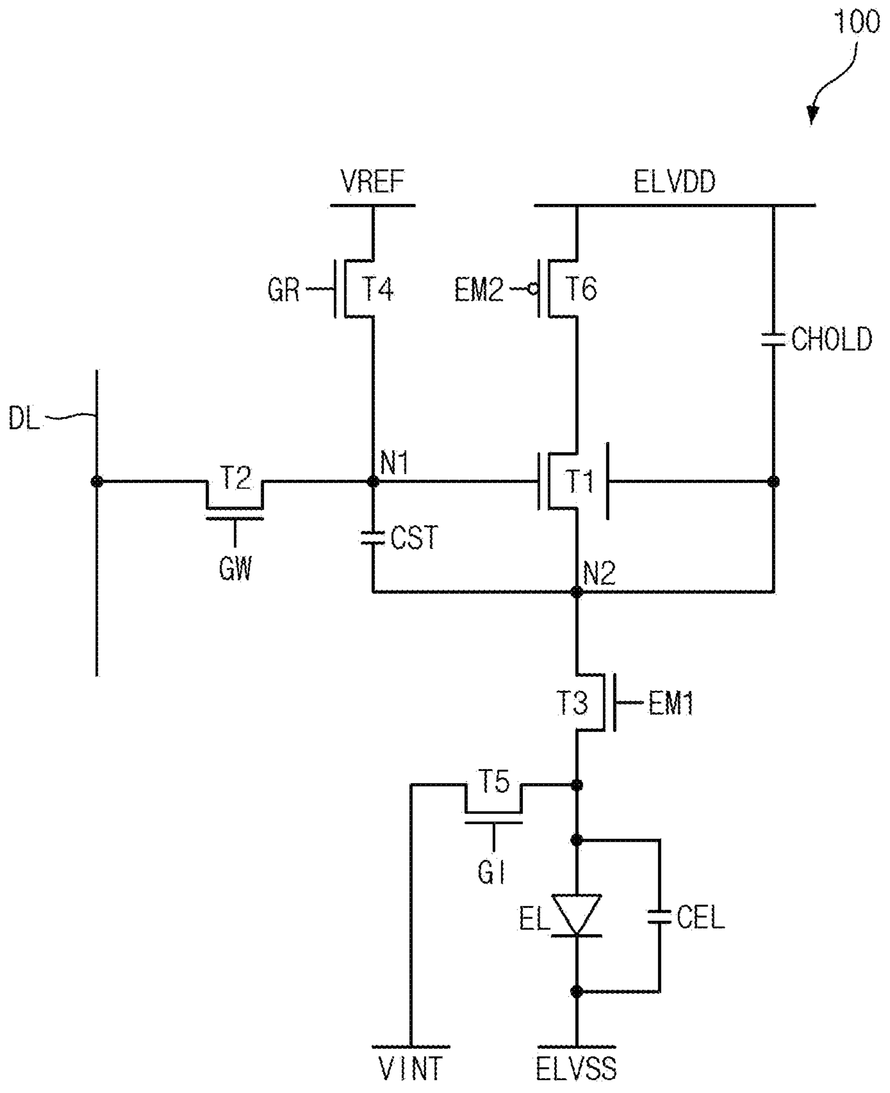
FIG. 1 is a circuit diagram illustrating a pixel of a display device according to an embodiment.

The embodiments are described more fully hereinafter with reference to the accompanying drawings. Like or similar reference numerals refer to like or similar elements throughout.

At least one embodiment relates to a pixel that adaptively changes how it handles voltage storage depending on the display mode, with the goal of enhancing luminance performance and reducing visual artifacts. Specifically, it introduces an emission path switch positioned between a hold capacitor and the anode of a light-emitting element. The operation of this emission path switch varies based on whether the display is in a normal mode or a high brightness mode (HBM).

In the normal mode, emission path switch is turned off during data writing, so the pixel operates using only the hold capacitor to store voltage for emission. This configuration isolates the intrinsic capacitance of the light-emitting element from the storage path, resulting in more stable operation and reduced sensitivity to fluctuations in the power supply or data voltage. This is particularly beneficial when using oxide transistors, which are more susceptible to current variation from voltage fluctuations compared to LTPS transistors.

In the high brightness mode, however, the emission path switch is turned on during data writing, allowing the intrinsic capacitance to be used in conjunction with the hold capacitor. This increases the effective capacitance during voltage storage, enabling a higher emission current and therefore greater brightness. Because the intrinsic capacitance is now contributing to the voltage storage, the hold capacitor can be designed with a smaller capacitance, which helps minimize the impact of supply voltage fluctuations and reduces the likelihood of luminance artifacts such as copy-mura and horizontal crosstalk.

Due to the ability to switch the emission path switch between the modes, this pixel architecture may dynamically optimize for either image stability or brightness, depending on the context. This flexibility may enhance display quality and power efficiency, making the design especially useful in mobile and high-performance display applications where both low power operation and high brightness are important.

FIG. 1 is a circuit diagram illustrating a pixel of a display device according to an embodiment.

Referring to FIG. 1, a pixel 100 of a display device according to an embodiment includes a first transistor T1, a first capacitor CST, a second capacitor CHOLD (e.g., a hold capacitor), a second transistor T2, a third transistor T3 (e.g., an emission path switch or transistor) and a light-emitting element EL. In some embodiments, the pixel 100 may further include a fourth transistor T4, a fifth transistor T5 and a sixth transistor T6. For example, the fourth transistor T4, the fifth transistor T5 and the sixth transistor T6 may be omitted.

The first transistor T1 may generate an emission current provided to the light-emitting element EL based on a voltage between a first node N1 and a second node N2, or a voltage stored across first and second electrodes of the first capacitor CST. In some embodiments, the first node N1 may be a gate node connected to a gate of the first transistor T1, and the second node N2 may be a source node connected to a source of the first transistor T1. The first transistor T1 may be referred to as a driving transistor for driving the light-emitting element EL. In some embodiments, the first transistor T1 may include a first gate connected to the first node N1, a first terminal which receives a first power supply voltage ELVDD (e.g., a high power supply voltage) through the sixth transistor T6, and a second terminal connected to the second node N2. Further, in some embodiments, as illustrated in FIG. 1, the first transistor T1 may further include a second gate connected to the second node N2. For example, the first gate may be a top gate located above an active layer of the first transistor T1, the second gate may be a bottom gate located below the active layer of the first transistor T1, and the first transistor T1 may have a double gate structure.

The first capacitor CST may be connected between the first node N1 and the second node N2. The first capacitor CST may be referred to as a storage capacitor for storing a data voltage transferred through a data line DL and the second transistor T2. In some embodiments, the first capacitor CST may include a first electrode connected to the first node N1, and a second electrode connected to the second node N2.

The second capacitor CHOLD may be connected between a line which transfers the first power supply voltage ELVDD and the second node N2. The second capacitor CHOLD may be referred to as a hold capacitor for holding a voltage of the second node N2. In some embodiments, the second capacitor CHOLD may include a first electrode which receives the first power supply voltage ELVDD, and a second electrode connected to the second node N2.

The second transistor T2 may transfer the data voltage from the data line DL to the first node N1 in response to a first gate signal GW. The first gate signal GW may be referred to as a write signal, and the second transistor T2 may be referred to as a scan transistor for transferring the data voltage from the data line DL. In some embodiments, the second transistor T2 may include a gate which receives the first gate signal GW, a first terminal connected to the data line DL, and a second terminal connected to the first node N1.

The third transistor T3 may selectively connect an anode electrode of the light-emitting element EL to the second node N2, or to the second electrodes of the first capacitor CST and the second capacitor CHOLD in response to a first emission signal EM1. The third transistor T3 may be referred to as a first emission transistor (e.g., an emission path switch) for forming a path of the emission current from the line which transfers the first power supply voltage ELVDD to a line which transfers a second power supply voltage ELVSS (e.g., a low power supply voltage). In some embodiments, the third transistor T3 may include a gate which receives the first emission signal EM1, a first terminal connected to the second node N2, and a second terminal connected to the anode electrode of the light-emitting element EL.

The fourth transistor T4 may transfer a reference voltage VREF to the first node N1 in response to a second gate signal GR. The second gate signal GR may be referred to as a reference signal or a reset signal, and the fourth transistor T4 may be referred to as a reference transistor or a reset transistor for applying the reference voltage VREF to the first node N1. In some embodiments, the fourth transistor T4 may include a gate which receives the second gate signal GR, a first terminal which receives the reference voltage VREF, and a second terminal connected to the first node N1.

The fifth transistor T5 may transfer an initialization voltage VINT to the second terminal of the third transistor T3 and the anode electrode of the light-emitting element EL in response to a third gate signal GI. The third gate signal GI may be referred to as an initialization signal, and the fifth transistor T5 may be referred to as an initialization transistor for initializing the second node N2 and/or the anode electrode. In some embodiments, the fifth transistor T5 may include a gate which receives the third gate signal GI, a first terminal which receives the initialization voltage VINT, and a second terminal connected to the second terminal of the third transistor T3 and the anode electrode of the light-emitting element EL.

The sixth transistor T6 may transfer the first power supply voltage ELVDD to the first terminal of the first transistor T1 in response to a second emission signal EM2. The sixth transistor T6 may be referred to as a second emission transistor for forming the path of the emission current from the line which transfers the first power supply voltage ELVDD to the line which transfers the second power supply voltage ELVSS. In some embodiments, the sixth transistor T6 may include a gate which receives the second emission signal EM2, a first terminal which receives the first power supply voltage ELVDD, and a second terminal connected to the first terminal of the first transistor T1.

The light-emitting element EL may emit light based on the emission current generated by the first transistor T1. In some embodiments, the light-emitting element EL may be, but is not limited to, an organic light-emitting diode ("OLED"). In other embodiments, the light-emitting element EL may be any suitable light-emitting element. For example, the light-emitting element EL may be a nano light-emitting diode ("NED"), a quantum dot ("QD") light-emitting diode, a micro light-emitting diode, an inorganic light-emitting diode, or any other suitable light-emitting element. In some embodiments, the light-emitting element EL may include the anode electrode connected to the third and fifth transistors T3 and T5, and a cathode electrode which receives the second power supply voltage ELVSS. Further, the light-emitting element EL may exhibit a parasitic or intrinsic capacitance between the anode electrode and the cathode electrode.

In some embodiments, the first transistor T1 may be an N-type metal-oxide-semiconductor ("NMOS") transistor. Further, the first transistor T1 may be an oxide transistor. In some embodiments, as illustrated in FIG. 1, the second, third, fourth and fifth transistors T2, T3, T4 and T5 may be, but is not limited to, NMOS transistors, and the sixth transistor T6 may be, but is not limited to, a P-type metal-oxide-semiconductor ("PMOS") transistor.

In the pixel 100 according to embodiments, as described below with reference to FIGS. 1 through 11, the third transistor T3 may be turned off while the second transistor T2 is turned on in a first mode, and may be turned on while the second transistor T2 is turned on in a second mode. That is, the second electrode of the first capacitor CST may be separated from the anode electrode of the light-emitting element EL during a data writing period of the first mode, but may be connected to the anode electrode of the light-emitting element EL during a data writing period of the second mode. In some embodiments, the first mode may be a normal mode, and the second mode may be a high brightness mode ("HBM"). Thus, the first transistor T1 may generate the emission current based on a voltage that is independent of the capacitance CEL of the light-emitting element EL during an emission period of the first mode (e.g., the normal mode), but may generate the emission current based on a voltage in which the capacitance CEL of the light-emitting element EL is reflected during an emission period of the second mode (e.g., the high brightness mode). For example, in the second mode, the voltage may be stored in the first capacitor CST and dependent on the capacitance CEL. Accordingly, in the second mode (e.g., the high brightness mode), not only the second capacitor CHOLD but also the capacitance CEL of the light-emitting element EL may be used, and a capacitance of the second capacitor CHOLD may be reduced compared with a conventional pixel in which the capacitance CEL of the light-emitting element EL is not used. Further, a luminance sensitivity of the pixel 100 according to a voltage variation (or a voltage fluctuation) may be enhanced or reduced, and a copymura phenomenon and/or a horizontal crosstalk phenomenon which occurs when the voltage of the second node N2 fluctuates due to a fluctuation of the first power supply voltage ELVDD and the second capacitor CHOLD may be prevented or reduced.

Hereinafter, with reference to FIGS. 1 through 6, an example of an operation of the pixel 100 in the first mode according to embodiments is described below.

Figure 2:
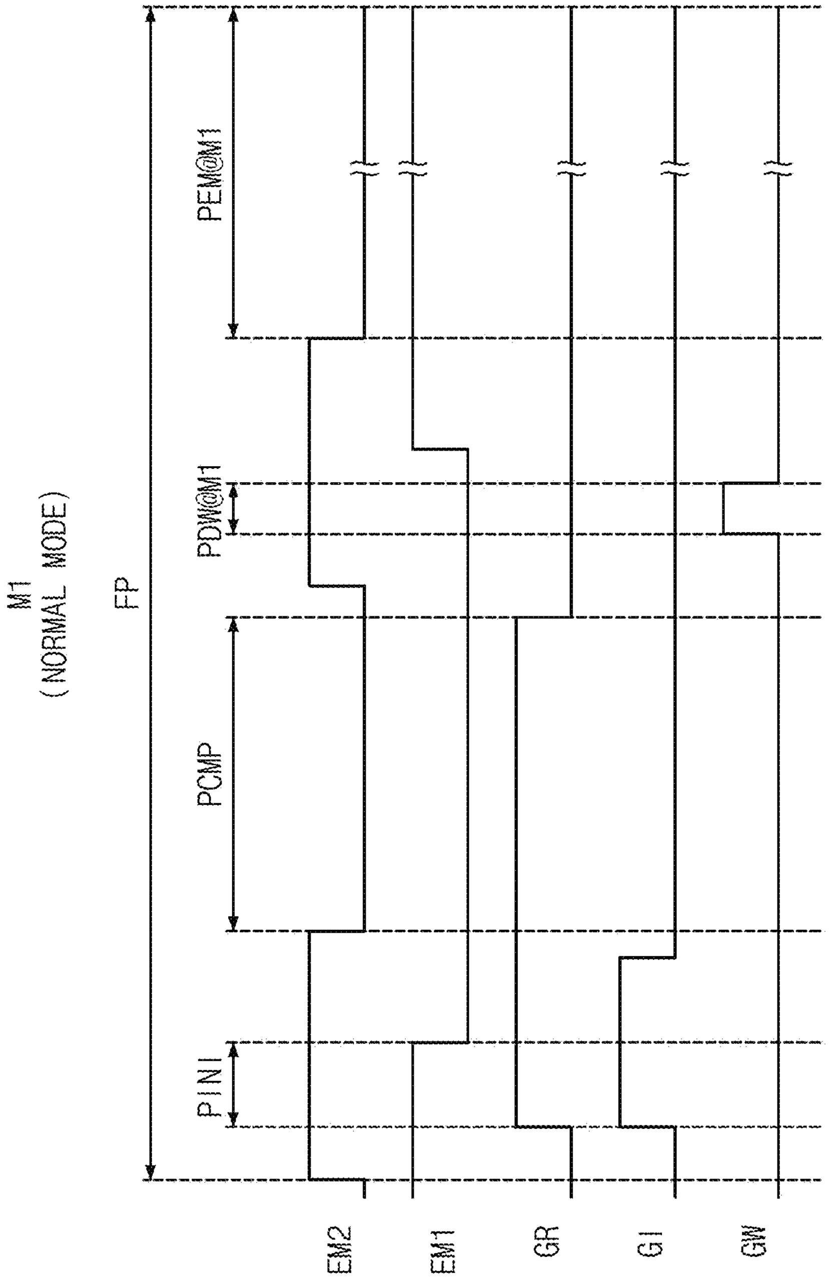
FIG. 2 is a timing diagram for describing an example of an operation of a pixel of a display device in a first mode.
Figure 3:
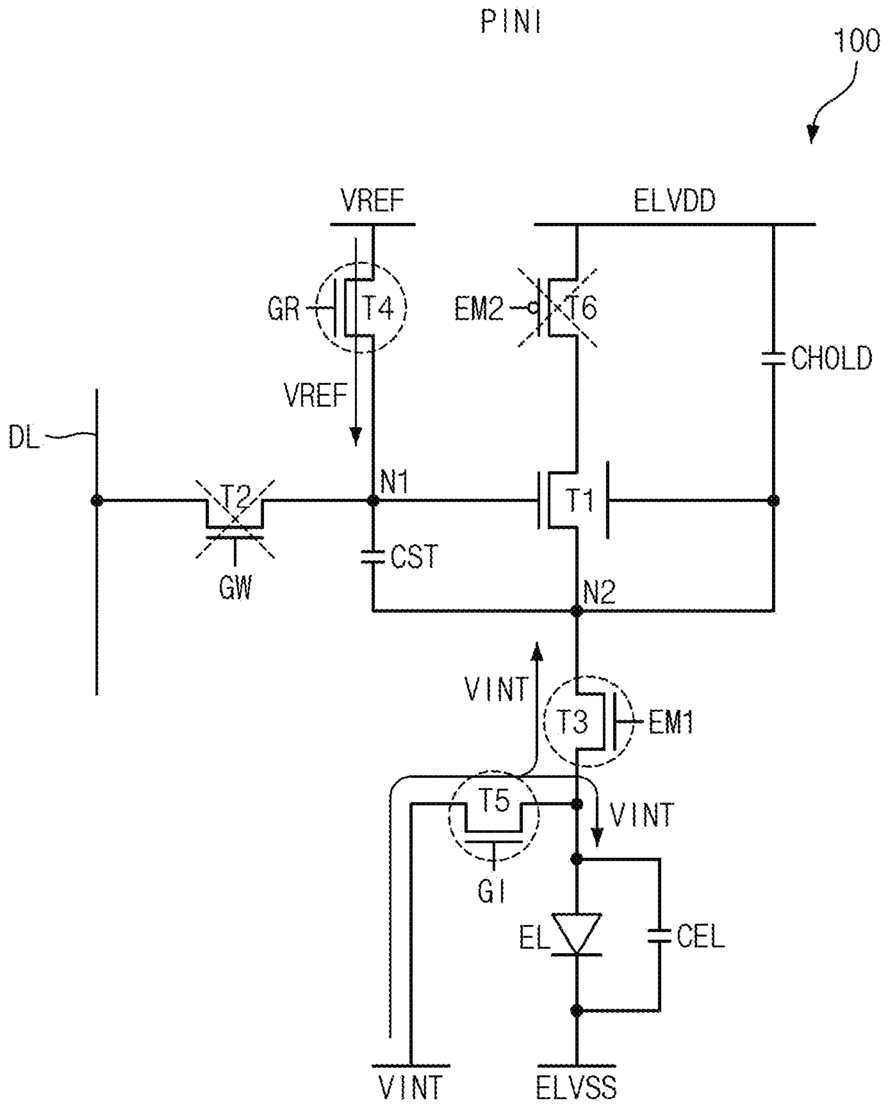
FIG. 3 is a circuit diagram for describing an example of an operation of a pixel in an initialization period.
Figure 4:
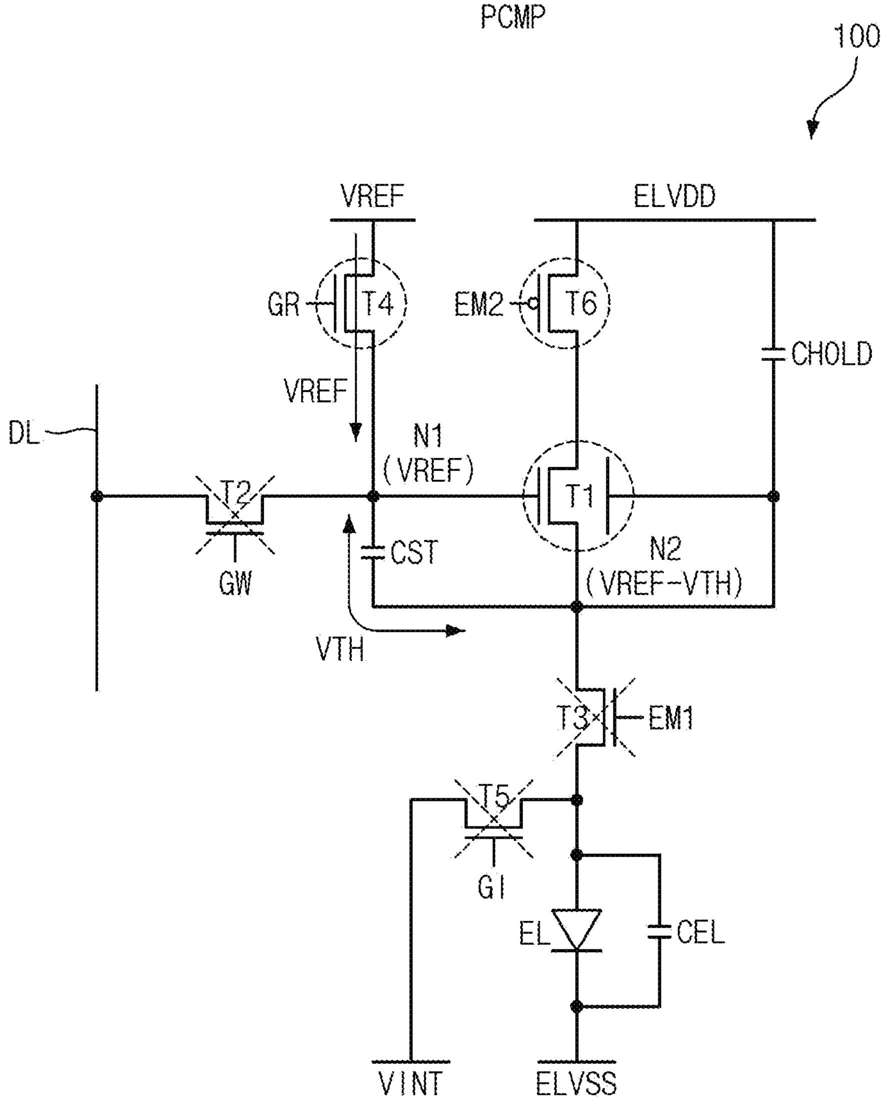
FIG. 4 is a circuit diagram for describing an example of an operation of a pixel in a compensation period.
Figure 5:
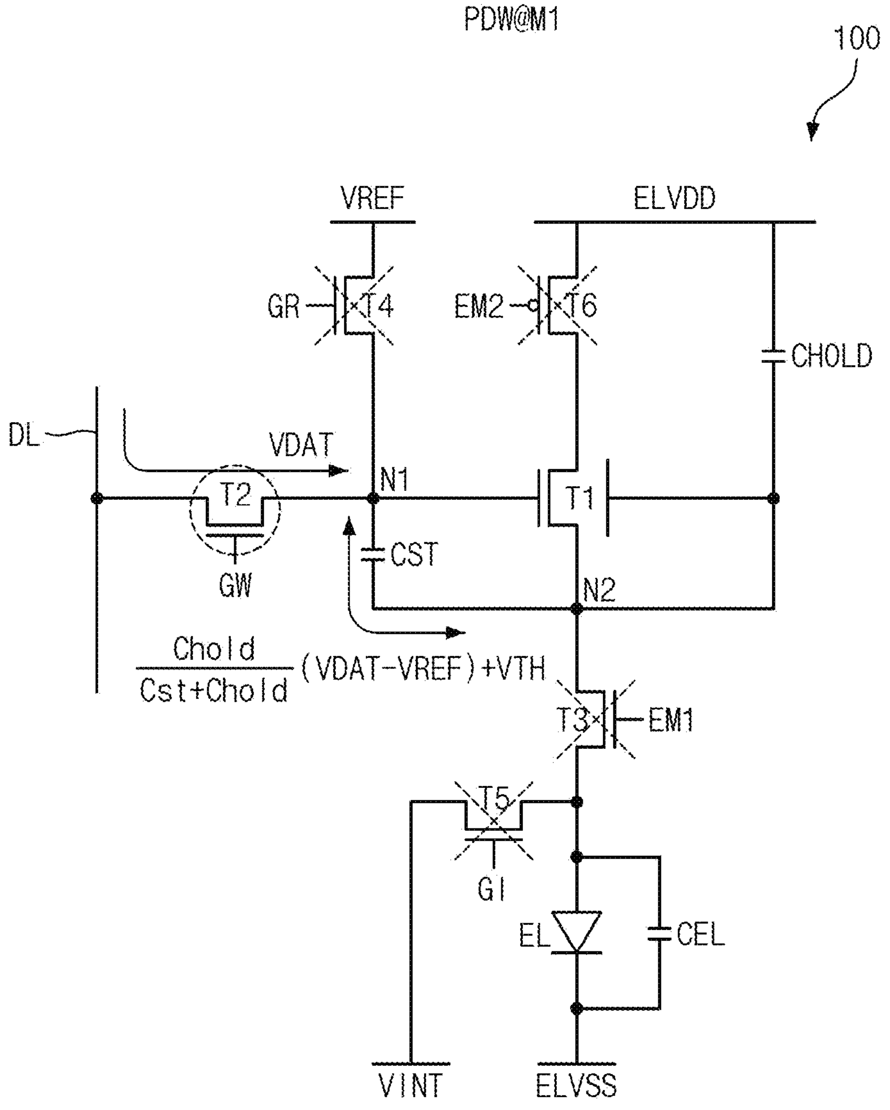
FIG. 5 is a circuit diagram for describing an example of an operation of a pixel in a data writing period of a first mode.
Figure 6:
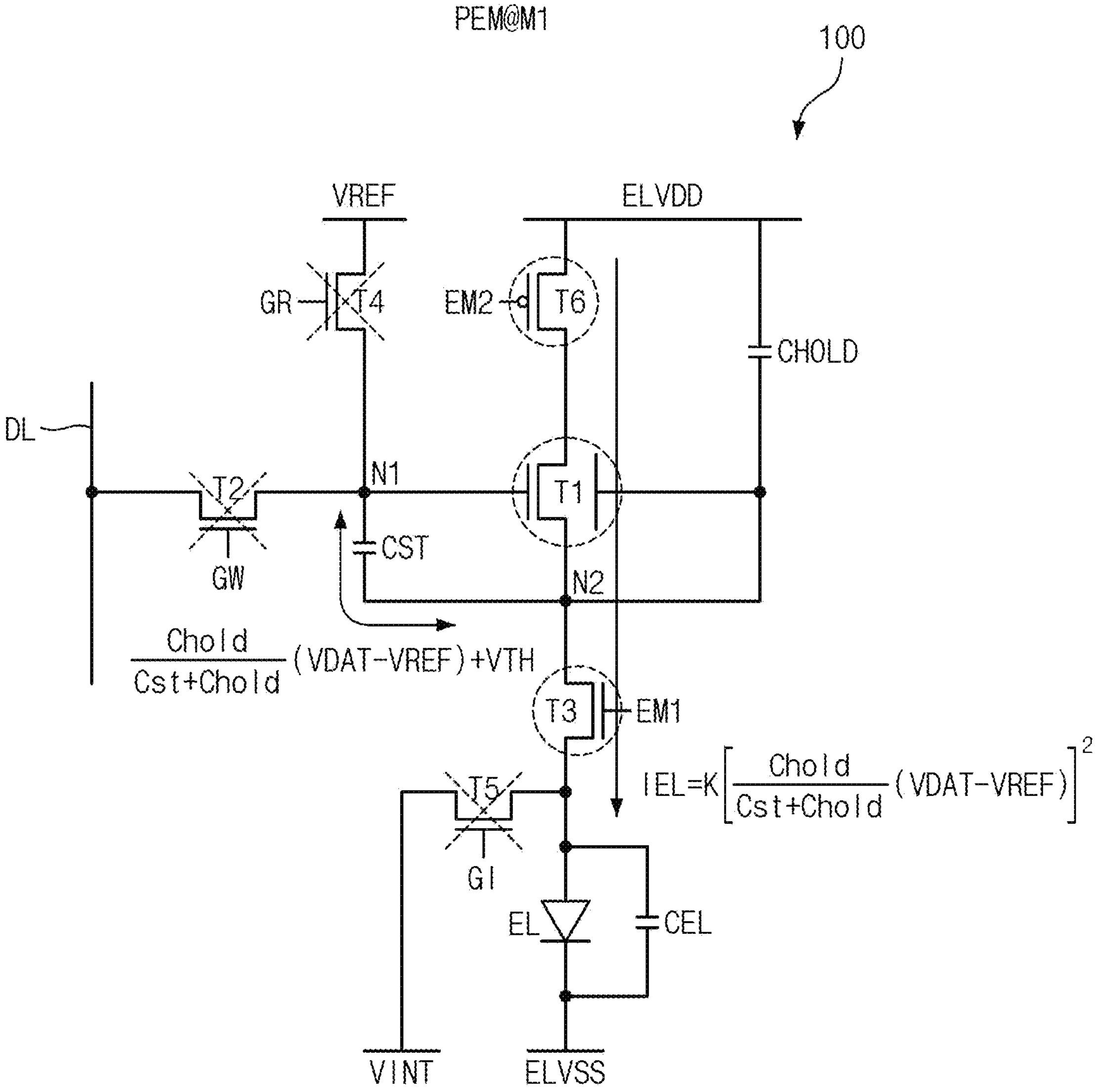
FIG. 6 is a circuit diagram for describing an example of an operation of a pixel in an emission period of a first mode.

FIG. 2 is a timing diagram for describing an example of an operation of the pixel of FIG. 1 in a first mode, FIG. 3 is a circuit diagram for describing an example of an operation of the pixel in an initialization period, FIG. 4 is a circuit diagram for describing an example of an operation of the pixel in a compensation period, FIG. 5 is a circuit diagram for describing an example of an operation of the pixel in a data writing period of a first mode, and FIG. 6 is a circuit diagram for describing an example of an operation of the pixel in an emission period of a first mode.

Referring to FIGS. 1 and 2, in the first mode M1 (e.g., the normal mode), a frame period FP for the pixel 100 of the display device includes an initialization period PINI in which the first node N1 and the second node N2 are initialized, a compensation period PCMP in which a threshold voltage of the first transistor T1 is stored in the first capacitor CST, a data writing period PDW@M1 in which the data voltage is transferred to the first node N1, and an emission period PEM@M1 in which the light-emitting element EL emits light.

In the initialization period PINI, the first emission signal EM1, the second emission signal EM2, the second gate signal GR and the third gate signal GI may have a first logic level (e.g., a high level), and the first gate signal GW may have a second other logic level (e.g., a low level). As illustrated in FIG. 3, the fourth transistor T4 may be turned on in response to the second gate signal GR having the high level, and may apply the reference voltage VREF to the first node N1. Further, the third transistor T3 may be turned on in response to the first emission signal EM1 having the high level, the fifth transistor T5 may be turned on in response to the third gate signal GI having the high level, and the third and fifth transistors T3 and T5 may apply the initialization voltage VINT to the second node N2. Accordingly, the first node N1 may be initialized based on the reference voltage VREF, and the second node N2 may be initialized based on the initialization voltage VINT. Further, the fifth transistor T5 may apply the initialization voltage VINT to the anode electrode of the light-emitting element EL, and the anode electrode of the light-emitting element EL may be initialized based on the initialization voltage VINT. Further, the second transistor T2 may be turned off in response to the first gate signal GW having the low level, and the sixth transistor T6 may be turned off in response to the second emission signal EM2 having the high level.

In the compensation period PCMP, the second gate signal GR may have the high level, and the first emission signal EM1, the second emission signal EM2, the first gate signal GW and the third gate signal GI may have the low level. As illustrated in FIG. 4, the fourth transistor T4 may be turned on in response to the second gate signal GR having the high level, and may apply the reference voltage VREF to the first node N1. Further, the sixth transistor T6 may be turned on in response to the second emission signal EM2 having the low level, and may apply the first power supply voltage ELVDD to the first terminal of the first transistor T1. Thus, the first terminal (e.g., a drain) of the first transistor T1 may receive the first power supply voltage ELVDD, the gate of the first transistor T1 may receive the reference voltage VREF, and the first transistor T1 may be turned on until the voltage of the second node N2 becomes a voltage VREF−VTH obtained by subtracting the threshold voltage VTH of the first transistor T1 from the reference voltage VREF. Accordingly, the first capacitor CST may store the threshold voltage VTH of the first transistor T1 between the first electrode and the second electrode of the first capacitor CST. Further, the second transistor T2 may be turned off in response to the first gate signal GW having the low level, the third transistor T3 may be turned off in response to the first emission signal EM1 having the low level, and the fifth transistor T5 may be turned off in response to the third gate signal GI having the low level.

As shown in FIG. 2, in the data writing period PDW@M1 of the first mode M1, the second emission signal EM2 and the first gate signal GW may have the high level, and the first emission signal EM1, the second gate signal GR and the third gate signal GI may have the low level. As illustrated in FIG. 5, the second transistor T2 may be turned on in response to the first gate signal GW having the high level, and may apply the data voltage VDAT to the first node N1. Thus, a voltage of the first node N1, or a voltage of the first electrode of the first capacitor CST may be changed from the reference voltage VREF to the data voltage VDAT, or may be changed by "VDAT−VREF". For example, the voltage at node N1 may increase by an amount equal to the difference between the data voltage VDAT and the reference voltage VREF.

Further, the third transistor T3 may be turned off in response to the first emission signal EM1 having the low level. Thus, during the data writing period PDW@M1 of the first mode M1, the second electrode of the first capacitor CST may be connected to the second capacitor CHOLD, and may be separated from the anode electrode of the light-emitting element EL. Accordingly, if the voltage of the first electrode of the first capacitor CST is changed by "VDAT−VREF", a voltage of the second electrode of the first capacitor CST may be changed by "Cst/(Cst+Chold)*(VDAT−VREF)". For example, when the voltage at the first electrode of capacitor CST changes by (VDAT−VREF), the voltage at the second electrode of the first capacitor CST changes by a fraction of this amount, determined by the ratio CST/(CST+CHOLD). Here, Cst may represent a capacitance of the first capacitor CST, and Chold may represent a capacitance of the second capacitor CHOLD. Thus, the voltage stored between the first and second electrodes of the first capacitor CST, or the gate-source voltage of the first transistor T1 may be $$``\frac{Chold}{Cst+Chold}(VDAT-VREF)+VTH".$$

That is, the voltage stored between the first and second electrodes of the first capacitor CST in the data writing period PDW@M1 of the first mode M1 should not be affected by the capacitance CEL of the light-emitting element EL. Further, the fourth transistor T4 may be turned off in response to the second gate signal GR having the low level, the fifth transistor T5 may be turned off in response to the third gate signal GI having the low level, and the sixth transistor T6 may be turned off in response to the second emission signal EM2 having the high level.

As shown in FIG. 2, in the emission period PEM@M1 of the first mode M1, the first emission signal EM1 may have the high level, and the first gate signal GW, the second gate signal GR, the third gate signal GI and the second emission signal EM2 may have the low level. As illustrated in FIG. 6, the second transistor T2 may be turned off in response to the first gate signal GW having the low level, the fourth transistor T4 may be turned off in response to the second gate signal GR having the low level, the fifth transistor T5 may be turned off in response to the third gate signal GI having the low level, the third transistor T3 may be turned on in response to the first emission signal EM1 having the high level, and the sixth transistor T6 may be turned on in response to the second emission signal EM2 having the low level. Further, the first transistor T1 may generate emission current IEL based on the voltage stored between the first and second electrodes of the first capacitor CST, or $$“\frac{Chold}{Cst+Chold}(VDAT-VREF)+VTH”.$$

Thus, the emission current IEL generated by the first transistor T1 in the emission period PEM@M1 of the first mode M1 may be determined by an equation $$“IEL=K\left[\frac{Chold}{Cst+Chold}(VDAT-VREF)\right]^2”,$$

Here, K is a current coefficient, which may be determined by at least one of a mobility, a capacitance, a width, or a length of the first transistor T1. The light-emitting element EL may emit light based on the emission current IEL.

Hereinafter, with reference to FIGS. 1 and 7 through 9, an example of an operation of the pixel 100 in the second mode according to embodiments is described below.

Figure 7:
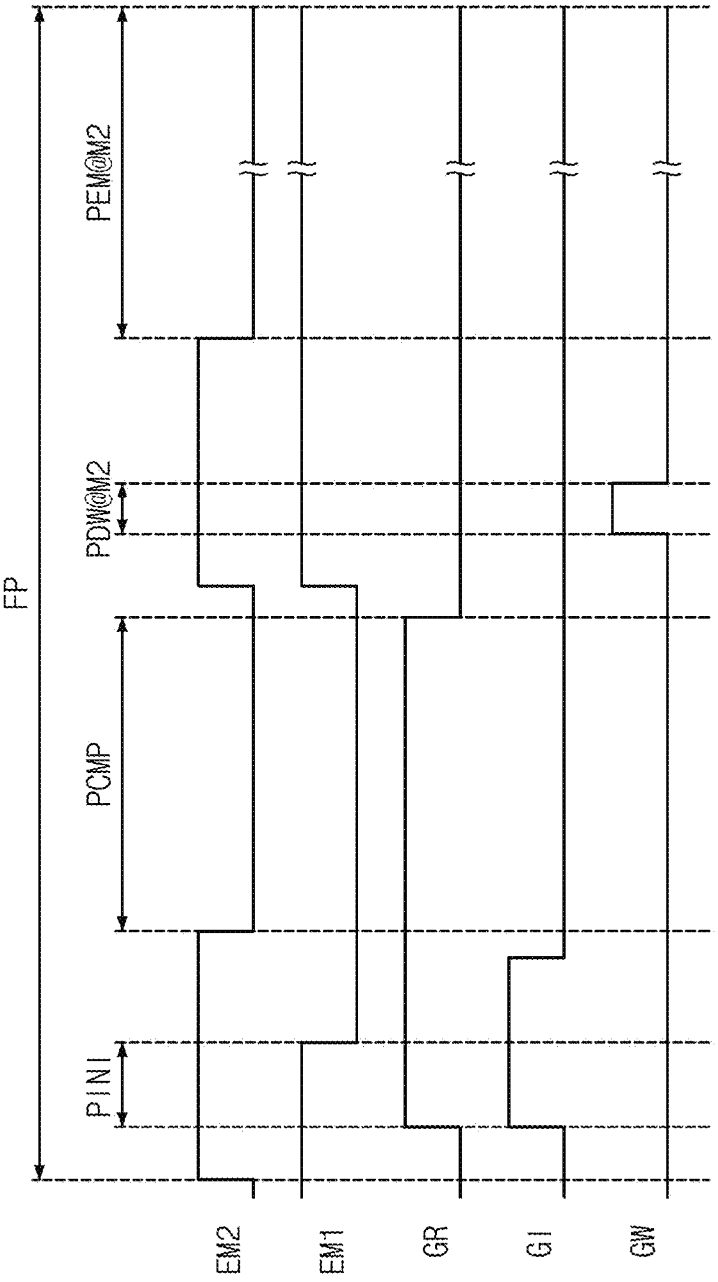
FIG. 7 is a timing diagram for describing an example of an operation of a pixel of a display device in a second mode.
Figure 8:
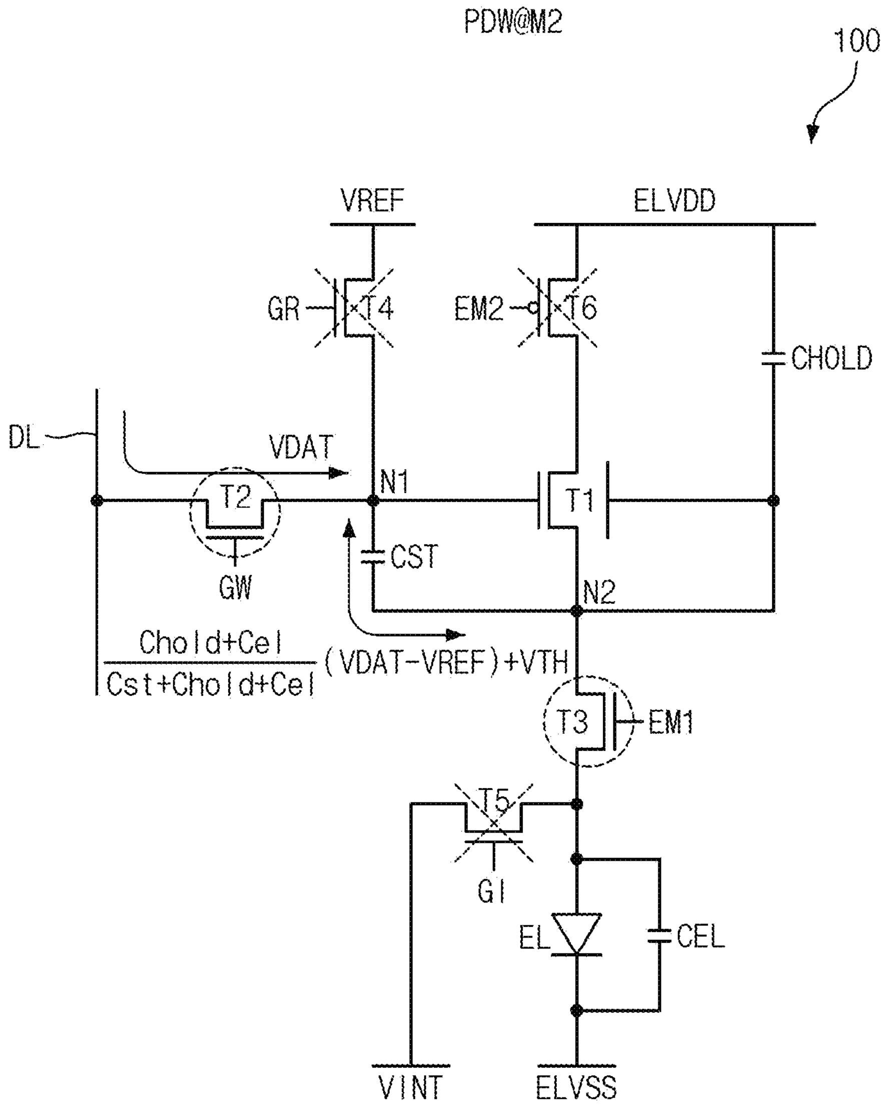
FIG. 8 is a circuit diagram for describing an example of an operation of a pixel in a data writing period of a second mode.
Figure 9:
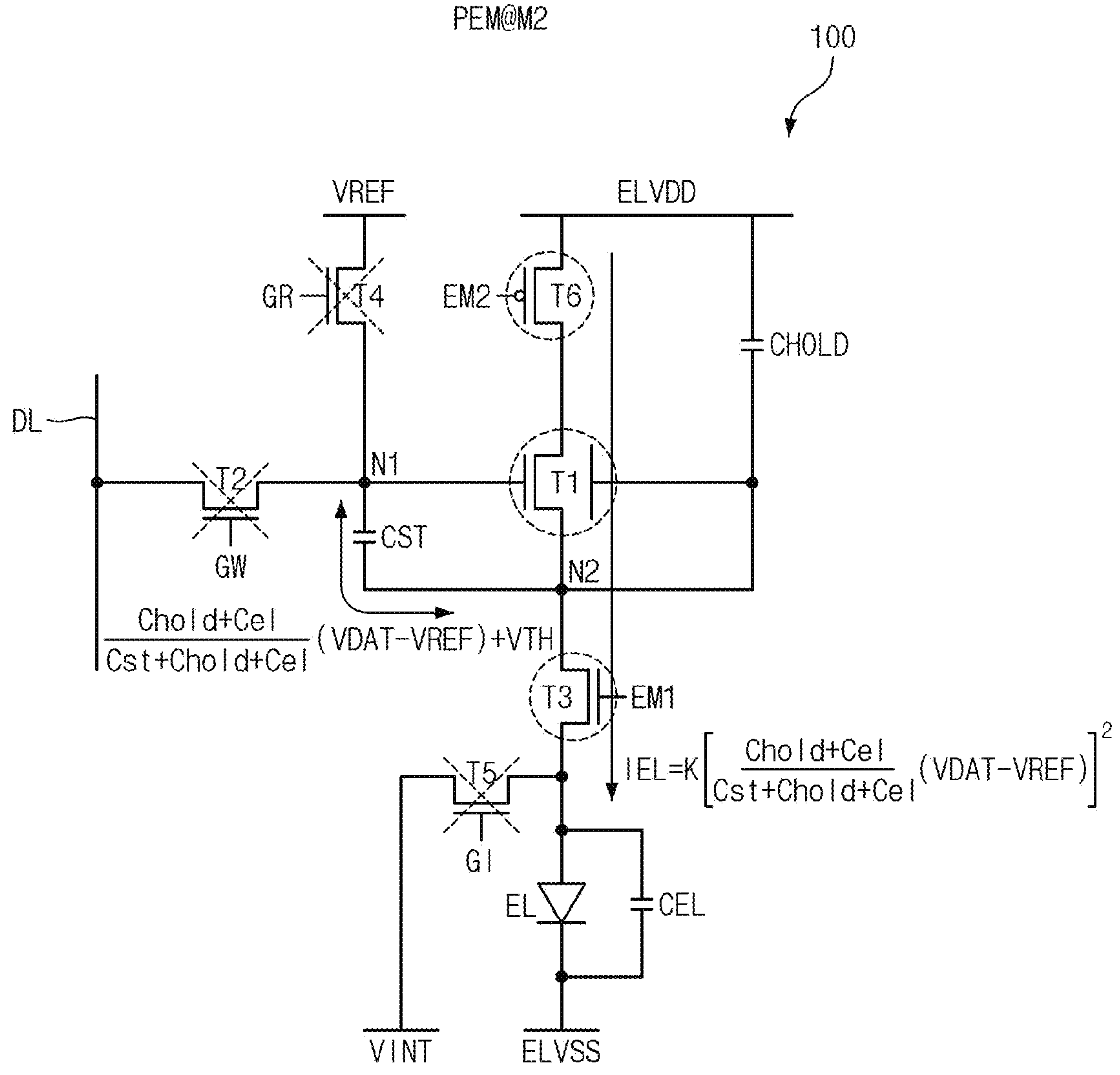
FIG. 9 is a circuit diagram for describing an example of an operation of a pixel in an emission period of a second mode.
Figure 10:
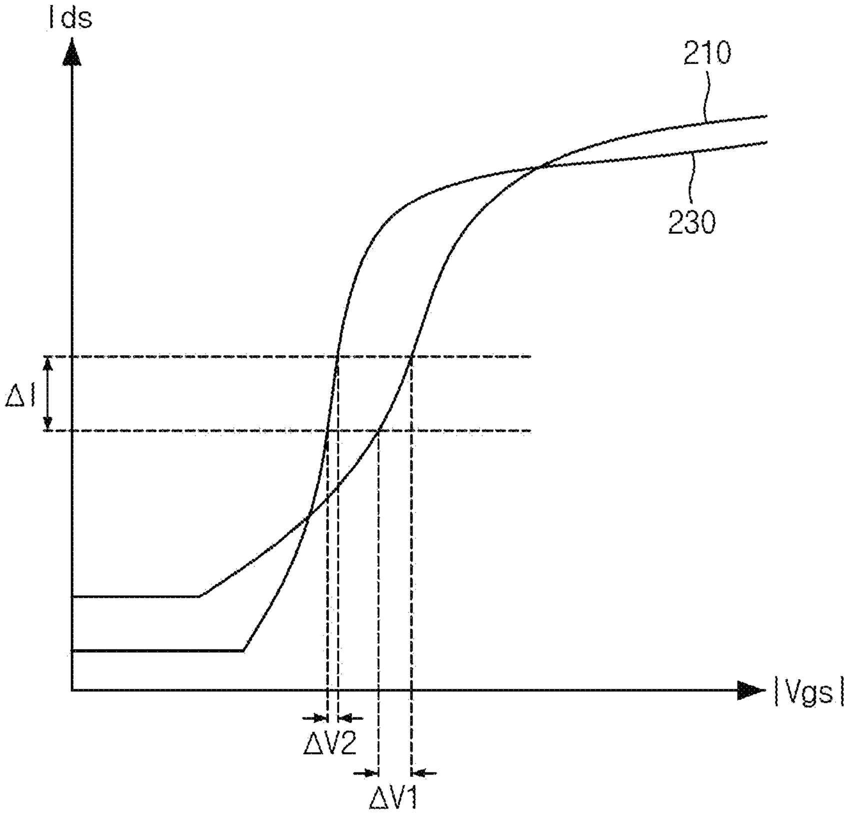
FIG. 10 is a diagram illustrating examples of a current of a low-temperature polycrystalline silicon ("LTPS") transistor and a current of an oxide transistor according to an absolute value of a gate-source voltage.
Figure 11:
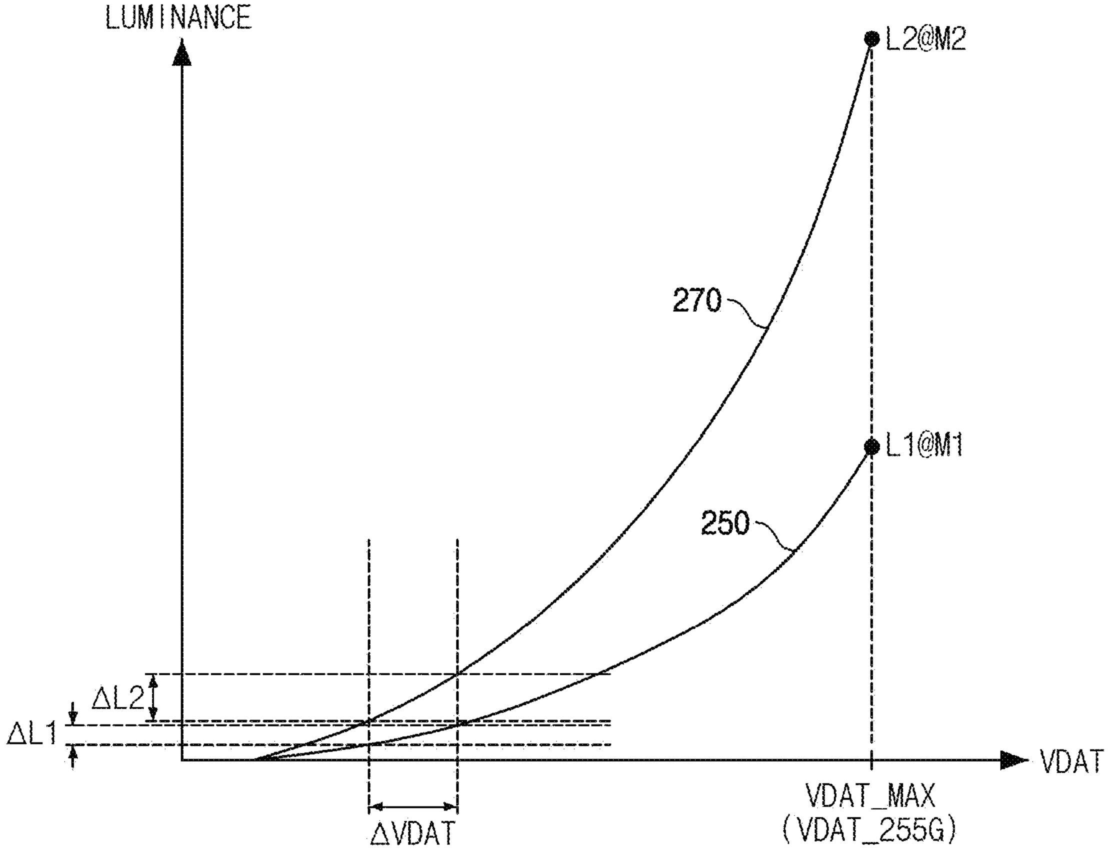
FIG. 11 is a diagram illustrating examples of luminances of a pixel according to a data voltage in a first mode and a second mode according to embodiments.

FIG. 7 is a timing diagram for describing an example of an operation of the pixel in a second mode, FIG. 8 is a circuit diagram for describing an example of an operation of a pixel in a data writing period of a second mode, FIG. 9 is a circuit diagram for describing an example of an operation of the pixel in an emission period of a second mode, FIG. 10 is a diagram illustrating examples of a current of a low-temperature polycrystalline silicon ("LTPS") transistor and a current of an oxide transistor according to an absolute value of a gate-source voltage, and FIG. 11 is a diagram illustrating examples of luminances of the pixel according to a data voltage in a first mode and a second mode according to embodiments.

Referring to FIGS. 1 and 7, in the second mode M2 (e.g., the high brightness mode), a frame period FP for the pixel 100 of the display device includes the initialization period PINI, the compensation period PCMP, a data writing period PDW@M2 and an emission period PEM@M2. In some embodiments, the operation of the pixel 100 in the initialization period PINI and the compensation period PCMP of the second mode M2 are the same as or substantially the same as the operation of the pixel 100 in the initialization period PINI and the compensation period PCMP of the first mode M1.

In the data writing period PDW@M2 of the second mode M2, the first emission signal EM1, the second emission signal EM2 and the first gate signal GW may have the high level, and the second gate signal GR and the third gate signal GI may have the low level. As illustrated in FIG. 8, the second transistor T2 may be turned on in response to the first gate signal GW having the high level, and may apply the data voltage VDAT to the first node N1. Thus, the voltage of the first node N1, or the voltage of the first electrode of the first capacitor CST may be changed from the reference voltage VREF to the data voltage VDAT, or may be changed by "VDAT−VREF". Further, the third transistor T3 may be turned on in response to the first emission signal EM1 having the high level. Thus, during the data writing period PDW@M2 of the second mode M2, the second electrode of the first capacitor CST may be connected not only to the second capacitor CHOLD but also to the anode electrode of the light-emitting element EL, whereby a capacitance CEL of the light-emitting element EL influences the voltage stored at the first capacitor CST. Accordingly, if the voltage of the first electrode of the first capacitor CST is changed by "VDAT−VREF", the voltage of the second electrode of the first capacitor CST may be changed by "Cst/(Cst+Chold+Cel)*(VDAT−VREF)". Here, Cel may represent a capacitance of the light-emitting element EL. Thus, the voltage stored across the first and second electrodes of the first capacitor CST, or the gate-source voltage of the first transistor T1 may be $$“\frac{Chold+Cel}{Cst+Chold+Cel}(VDAT-VREF)+VTH”.$$

That is, the voltage stored across the first and second electrodes of the first capacitor CST in the data writing period PDW@M2 of the second mode M2 may be a voltage in which the capacitance CEL of the light-emitting element EL is reflected. Further, the fourth transistor T4 may be turned off in response to the second gate signal GR having the low level, the fifth transistor T5 may be turned off in response to the third gate signal GI having the low level, and the sixth transistor T6 may be turned off in response to the second emission signal EM2 having the high level.

In the emission period PEM@M2 of the second mode M2, the first emission signal EM1 may have the high level, and the first gate signal GW, the second gate signal GR, the third gate signal GI and the second emission signal EM2 may have the low level. As illustrated in FIG. 9, the second transistor T2 may be turned off in response to the first gate signal GW having the low level, the fourth transistor T4 may be turned off in response to the second gate signal GR having the low level, the fifth transistor T5 may be turned off in response to the third gate signal GI having the low level, the third transistor T3 may be turned on in response to the first emission signal EM1 having the high level, and the sixth transistor T6 may be turned on in response to the second emission signal EM2 having the low level. Further, the first transistor T1 may generate the emission current IEL based on the voltage stored across the first and second electrodes of the first capacitor CST, or $$“\frac{Chold+Cel}{Cst+Chold+Cel}(VDAT-VREF)+VTH”.$$

Thus, the emission current IEL generated by the first transistor T1 in the emission period PEM@M2 of the second mode M2 may be determined by an equation $$\text{“}IEL = K\left[\frac{Chold + Cel}{Cst + Chold + Cel}(VDAT - VREF)\right]^2\text{”},$$

The light-emitting element EL may emit light based on the emission current IEL.

FIG. 10 illustrates a current 210 of a P-channel Metal-Oxide-Semiconductor (PMOS) transistor (or an LTPS transistor) and a current 230 (or a drain-source current Ids) of a P-channel Metal-Oxide-Semiconductor (NMOS) transistor (or an oxide transistor) according to an absolute value |Vgs| of a gate-source voltage. As illustrated in FIG. 10, with respect to the same current variation ΔI, a voltage variation ΔV2 for the NMOS transistor may be less than a voltage variation ΔV1 for the PMOS transistor. In other words, with respect to the same voltage variation, a current variation of the NMOS transistor may be greater than a current variation of the PMOS transistor. Thus, compared with a pixel in which the driving transistor is implemented as the PMOS transistor, a pixel in which the driving transistor is implemented as the NMOS transistor may have a higher luminance sensitivity according to a voltage variation (or a voltage fluctuation). That is, a luminance of a pixel in which the driving transistor is implemented as the NMOS transistor may be undesirably distorted by an undesired voltage fluctuation (e.g., an undesired fluctuation of the data voltage VDAT or the first power supply voltage ELVDD). Thus, when the pixel having the driving transistor implemented as the NMOS transistor emits light with a luminance corresponding to a low gray level, in particular when the pixel having the driving transistor implemented as the NMOS transistor emits light with a luminance corresponding to a low gray level in the normal mode, luminance distortion due to the high luminance sensitivity may be perceived.

In addition, the pixel having the driving transistor implemented as the NMOS transistor may use the same gamma curve (or a luminance curve according to the data voltage VDAT) in the normal mode and the high luminance mode. For example, the pixel having the driving transistor implemented as the NMOS transistor may emit light with a luminance curve 270 illustrated in FIG. 11 in the normal mode and the high brightness mode. Further, for example, in the case of the pixel having the driving transistor implemented as the NMOS transistor, a portion of the luminance curve 270 corresponding to a relatively small data voltage range may be used in the normal mode, and the entire luminance curve 270 corresponding to a relatively large data voltage range may be used in the high brightness mode. Thus, in the case of the pixel having the driving transistor implemented as the NMOS transistor, in the normal mode, a relatively large luminance fluctuation ΔL2 may occur and may be perceived due to an undesired data voltage fluctuation ΔVDAT.

However, in the pixel 100 according to an embodiment of the disclosure, as described above with reference to FIGS. 6 and 9, the emission current IEL generated by the first transistor T1 in the first mode M1 (e.g., the normal mode) may be determined by the equation $$\text{“}IEL = K\left[\frac{Chold}{Cst + Chold}(VDAT - VREF)\right]^2\text{”},$$

but the emission current IEL generated by the first transistor T1 in the second mode M2 (e.g., the high brightness mode) may be determined by the equation $$\text{“}IEL = K\left[\frac{Chold + Cel}{Cst + Chold + Cel}(VDAT - VREF)\right]^2\text{”},$$

That is, with respect to the same data voltage VDAT, the emission current IEL generated by the first transistor T1 in the first mode M1 may be less than the emission current IEL generated by the first transistor T1 in the second mode M2.

For example, as illustrated in FIG. 11, when the data voltage VDAT is the maximum data voltage VDAT_MAX (e.g., the data voltage VDAT_255G corresponding to a 255-gray level), the emission current IEL in the first mode M1 may be less than the emission current IEL in the second mode M2, and thus a luminance L1@M1 of the pixel 100 in the first mode M1 may be lower than a luminance L2@M2 of the pixel 100 in the second mode M2. That is, as illustrated in FIG. 11, the pixel 100 according to embodiments may use a relatively low gamma curve or a relatively low luminance curve 250 in the first mode M1 (e.g., the normal mode), and may use a relatively high gamma curve or a relatively high luminance curve 250 in the second mode M2 (e.g., the high luminance mode). For example, with a maximum data voltage VDAT of 5 V, the emission current in the first mode (normal mode) might be about 14.2 μA, whereas in the second mode (high brightness mode) it could be around 18.0 μA. Thus, even at the same data voltage, the pixel emits lower luminance in the normal mode compared to the high brightness mode, demonstrating the described difference in emission current and luminance between the two modes. Accordingly, with respect to the same data voltage fluctuation ΔVDAT, the luminance fluctuation ΔL1 in the first mode M1 may be less than the luminance fluctuation ΔL2 in the second mode M2 (or the luminance fluctuation of the conventional pixel). Thus, even if the first transistor T1 is implemented as the NMOS transistor (or the oxide transistor), the luminance sensitivity according to the voltage variation (or the voltage fluctuation) of the pixel 100 according to embodiments in the first mode M1 may be enhanced or reduced.

Further, in the pixel having the driving transistor implemented as the NMOS transistor, when the first power supply voltage ELVDD fluctuates, the voltage of the second node N2 (e.g., the source node) fluctuates by the second capacitor CHOLD, and a copymura phenomenon and/or a horizontal crosstalk phenomenon may occur due to the undesired fluctuation of the voltage of the second node N2. However, in the pixel using the NMOS driving transistor, the capacitance CEL of the light-emitting element EL is not used. In contrast, according to an embodiment of the disclosure, the pixel 100 uses both the second capacitor CHOLD and the capacitance CEL of the light-emitting element EL in the second mode M2. Accordingly, the second capacitor CHOLD of the pixel 100 according to embodiments may be designed such that the capacitance of the second capacitor CHOLD is reduced compared with the capacitance of the second capacitor CHOLD of the pixel using the NMOS driving transistor. For example, the capacitance of the second capacitor CHOLD of the pixel 100 according to embodiments may be less than that of the pixel that uses the NMOS driving transistor by an amount equal to the capacitance CEL of the light-emitting element EL. Therefore, in the pixel 100 according to embodiments, since the capacitance of the second capacitor CHOLD is reduced, the fluctuation of the voltage the second node N2 caused by the fluctuation of the first power supply voltage ELVDD may be reduced, and the copy-mura phenomenon and/or the horizontal crosstalk phenomenon may be prevented or reduced.

As described above, in the pixel 100 according to embodiments, the third transistor T3 connected between the second capacitor CHOLD and the anode electrode may be turned off when the data voltage VDAT is provided to the pixel 100 in the first mode M1 (e.g., the normal mode), and may be turned on when the data voltage VDAT is provided to the pixel 100 in the second mode M2 (e.g., the high brightness mode). Thus, not only the second capacitor CHOLD but also the capacitance CEL of the light-emitting element EL may be used in the second mode M2, and the capacitance of the second capacitor CHOLD may be reduced compared with the pixel that uses the NMOS driving transistor. Accordingly, in the pixel 100 according to embodiments, the luminance sensitivity according to the voltage variation (or the voltage fluctuation), the copy-mura phenomenon, and/or the horizontal crosstalk phenomenon may be reduced.

Figure 12:
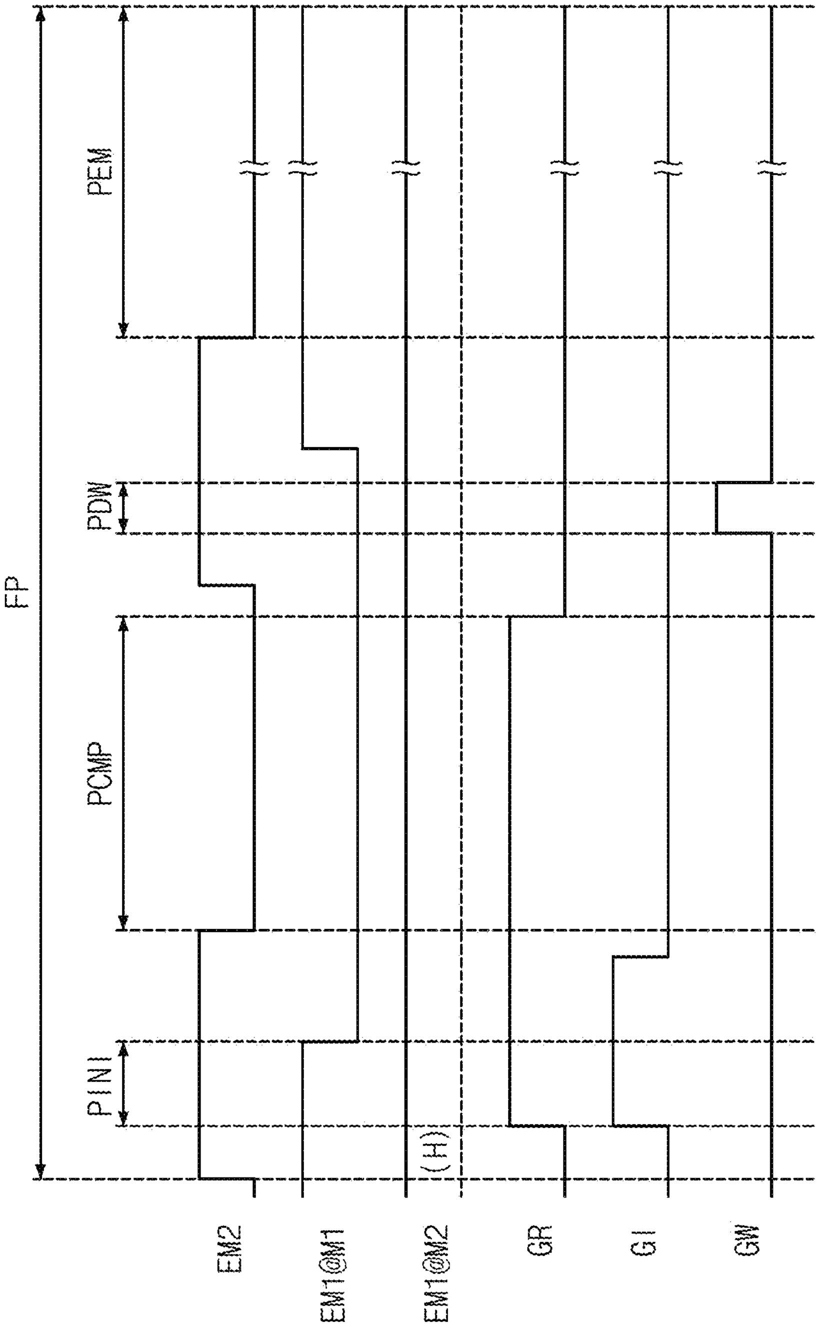
FIG. 12 is a timing diagram for describing another example of operations of a pixel in first and second modes according to embodiments.

FIG. 12 is a timing diagram for describing another example of operations of the pixel in first and second modes according to embodiments.

Referring to FIGS. 1 and 12, a frame period FP for the pixel 100 of the display device includes the initialization period PINI, the compensation period PCMP, the data writing period PDW and the emission period PEM. Similar to the first emission signal EM1 illustrated in FIG. 2, the first emission signal EM1@M1 in the first mode M1 illustrated in FIG. 12 may have the high level in the initialization period PINI and the emission period PEM, and the low level in the compensation period PCMP and the data writing period PDW. Thus, in the first mode M1, as described above with reference to FIGS. 2 through 6, the third transistor T3 may be turned off in the compensation period PCMP and the data writing period PDW, and may be turned on in the initialization period PINI and the emission period PEM.

However, unlike the first emission signal EM1 illustrated in FIG. 7, which has the low level in the compensation period PCMP, the first emission signal EM1@M2 in the second mode M2 illustrated in FIG. 12 may have the high level H in the entire period of the frame period FP. Thus, unlike the embodiment described above with reference to FIG. 7 in which the third transistor T3 is turned on in the initialization period PINI, the data writing period PDW and the emission period PEM and is turned off in the compensation period PCMP in the second mode M2, in the embodiment in which the pixel 100 receives the first emission signal EM1@M2 in the second mode M2 illustrated in FIG. 12, the third transistor T3 may be turned on during the entire period of the frame period FP. For example, unlike the previously described embodiment with reference to FIG. 7, in which the third transistor T3 is turned on during the initialization period PINI, the data writing period PDW, and the emission period PEM, but turned off during the compensation period PCMP in the second mode M2, the embodiment illustrated in FIG. 12 provides the first emission signal EM1@M2 such that the third transistor T3 remains turned on throughout the entire frame period FP.

Figure 13:
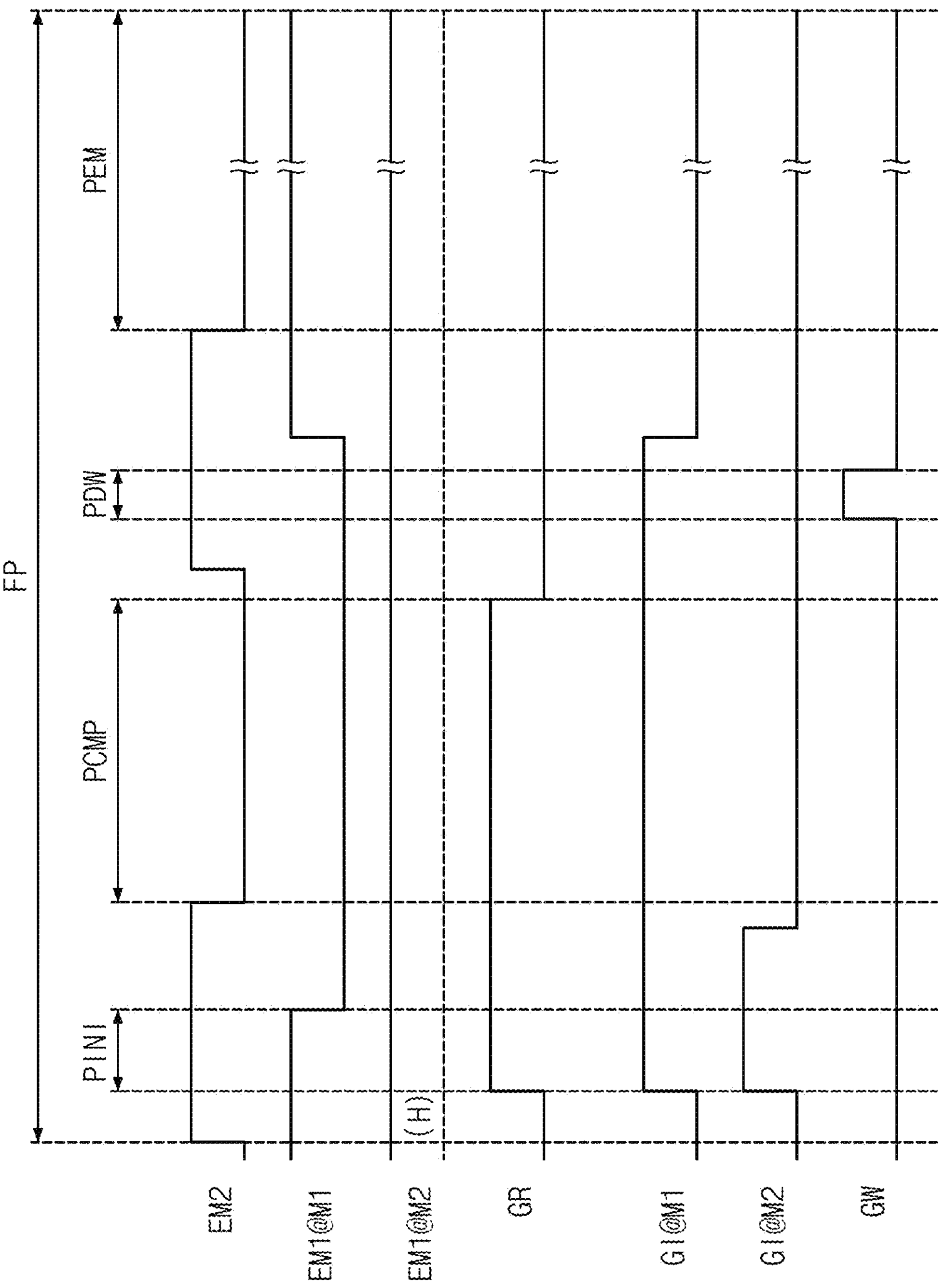
FIG. 13 is a timing diagram for describing still another example of operations of a pixel in first and second modes according to embodiments.

FIG. 13 is a timing diagram for describing still another example of operations of the pixel in first and second modes according to embodiments.

Referring to FIGS. 1 and 13, a frame period FP for the pixel 100 of the display device includes the initialization period PINI, the compensation period PCMP, the data writing period PDW and the emission period PEM. The first emission signal EM1@M1 and EM1@M2, the second emission signal EM2, the first gate signal GW and the second gate signal GR illustrated in FIG. 13 may be the same as or substantially the same as the first emission signal EM1@M1 and EM1@M2, the second emission signal EM2, the first gate signal GW and the second gate signal GR illustrated in FIG. 12.

Similar to the third gate signal GI illustrated in FIGS. 2, 7 and 12, the third gate signal GI@M2 in the second mode M2 illustrated in FIG. 13 may have the high level in the initialization period PINI, and may have the low level in the compensation period PCMP, the data writing period PDW and the emission period PEM. Similar to the embodiments illustrated in FIGS. 2, 7 and 12 in which the pixel 100 receives the third gate signal GI, in the second mode M2, the fifth transistor T5 may be turned off in the compensation period PCMP, the data writing period PDW and the emission period PEM, and may be turned on in the initialization period PINI.

However, unlike the third gate signal GI illustrated in FIGS. 2, 7 and 12, the third gate signal GI@M1 in the first mode M1 illustrated in FIG. 13 has the high level in the initialization period PINI, the compensation period PCMP and the data writing period PDW, and has the low level in the emission period PEM.

Thus, unlike the embodiments described above with reference to FIGS. 2 and 3 in which the fifth transistor T5 is turned off in the compensation period PCMP, the data writing period PDW and the emission period PEM and is turned on in the initialization period PINI in the first mode M1, in the embodiment in which the pixel 100 receives the third gate signal GI@M1 in the first mode M1 illustrated in FIG. 13, the fifth transistor T5 may be turned off in the emission period PEM, and may be turned on in the initialization period PINI, the compensation period PCMP and the data writing period PDW. For example, in the embodiment of FIG. 13, the fifth transistor T5 remains turned on throughout the initialization, compensation, and data writing periods in the first mode M1; whereas in the earlier-described embodiments (FIGS. 2 and 3), transistor T5 is turned on only during the initialization period. Thus, in the first mode M1, the fifth transistor T5 may apply the initialization voltage VINT to the anode electrode of the light-emitting element EL in the initialization period PINI, the compensation period PCMP and the data writing period PDW, and the anode electrode of the light-emitting element EL may be initialized based on the initialization voltage VINT in the initialization period PINI, the compensation period PCMP and the data writing period PDW.

Figure 14:
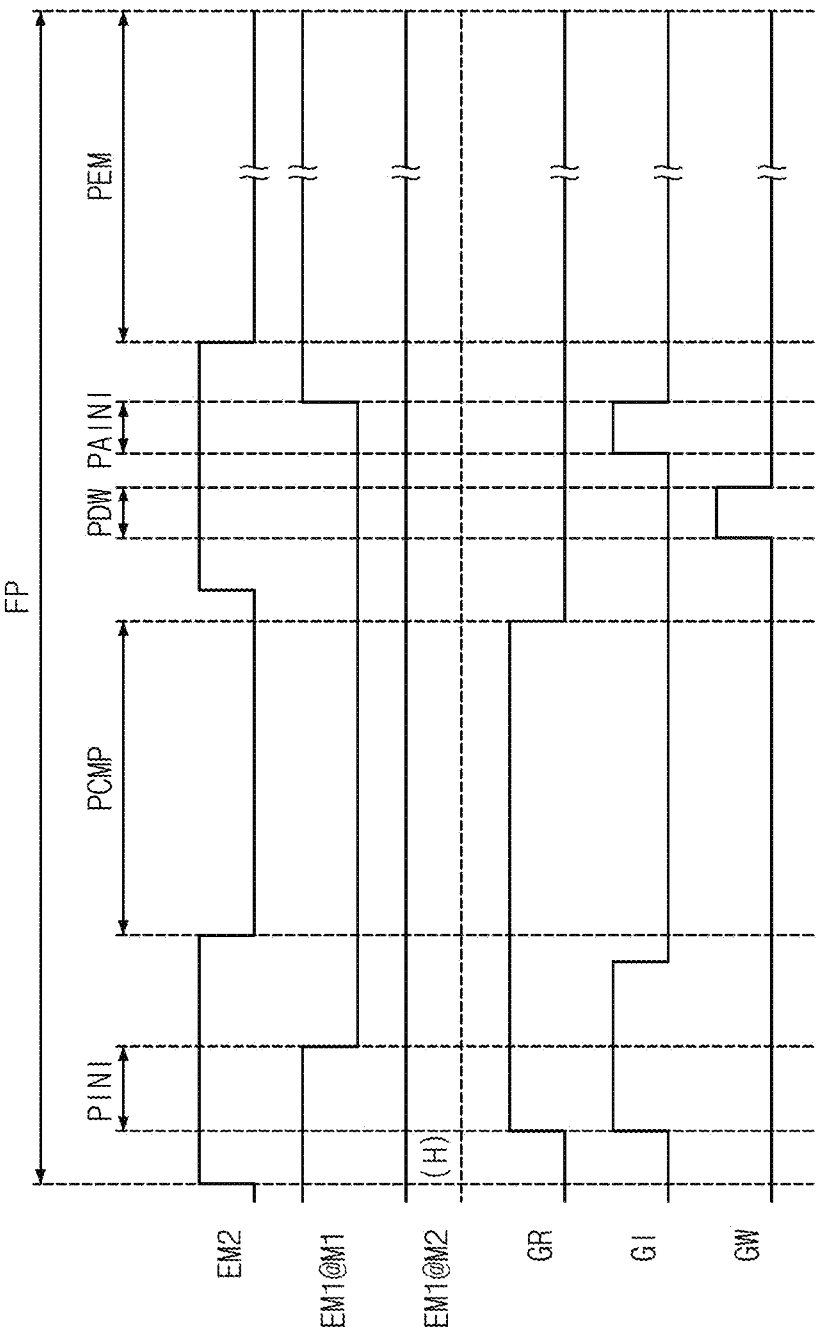
FIG. 14 is a timing diagram for describing still another example of operations of a pixel in first and second modes according to embodiments.
Figure 15:
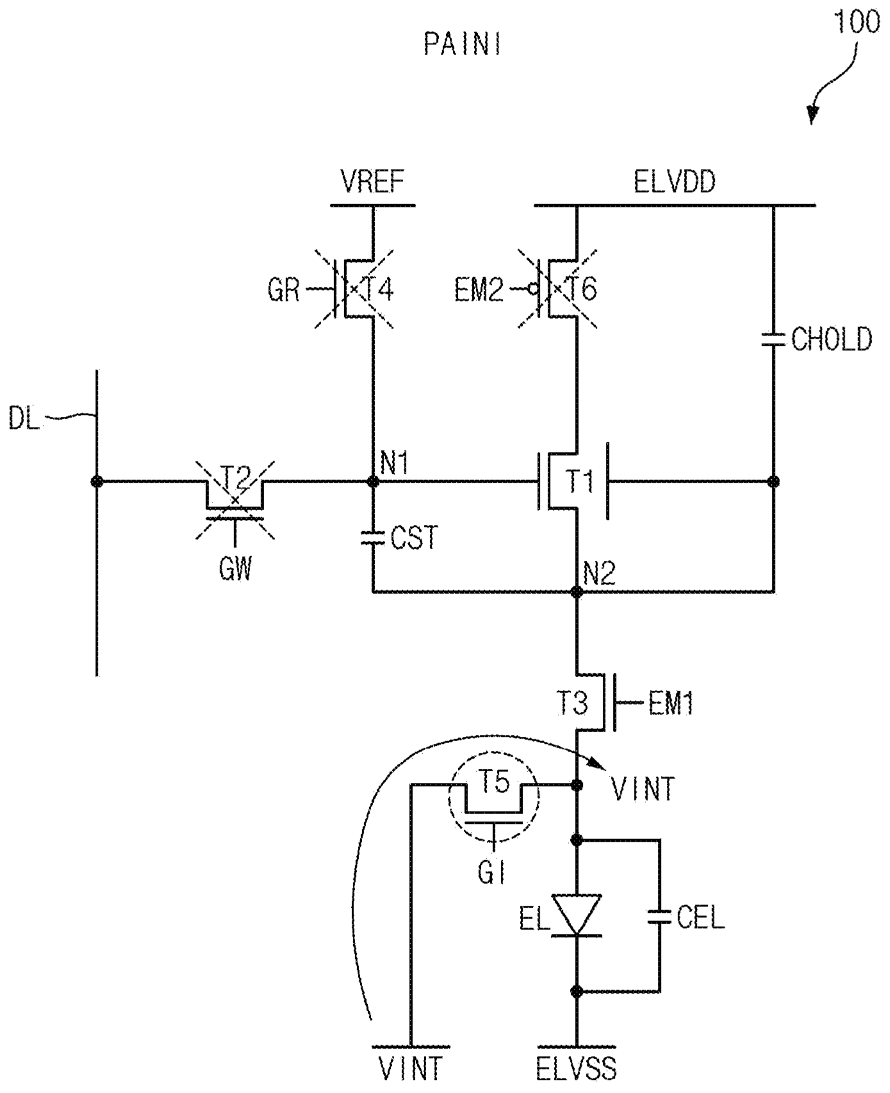
FIG. 15 is a circuit diagram for describing an example of operations of a pixel in anode initialization periods of first and second modes.

FIG. 14 is a timing diagram for describing still another example of operations of the pixel in first and second modes according to embodiments, and FIG. 15 is a circuit diagram for describing an example of operations of the pixel in anode initialization periods of first and second modes.

Referring to FIGS. 1 and 14, a frame period FP for the pixel 100 of the display device includes the initialization period PINI, the compensation period PCMP, the data writing period PDW, an anode initialization period PAINI in which the anode electrode of the light-emitting element EL is initialized, and the emission period PEM. Compared with the frame periods FP illustrated in FIGS. 2, 7, 12 and 13, the frame period FP illustrated in FIG. 14 further includes the anode initialization period PAINI between the data writing period PDW and the emission period PEM. Further, the first emission signal EM1@M1 and EM1@M2, the second emission signal EM2, the first gate signal GW and the second gate signal GR illustrated in FIG. 14 may be the same as or substantially the same as the first emission signal EM1@M1 and EM1@M2, the second emission signal EM2, the first gate signal GW and the second gate signal GR illustrated in FIG. 12.

The third gate signal GI illustrated in FIG. 14 may have the high level not only in the initialization period PINI but also in the anode initialization period PAINI between the data writing period PDW and the emission period PEM. Thus, in each of the first mode M1 and the second mode M2, as illustrated in FIG. 15, the fifth transistor T5 may be turned on not only in the initialization period PINI but also in the anode initialization period PAINI, and the anode electrode of the light-emitting element EL may be initialized based on the initialization voltage VINT not only in the initialization period PINI but also in the anode initialization period PAINI. Further, in each of the anode initialization periods PAINI of the first mode M1 and the second mode M2, the second, fourth and sixth transistors T2, T4 and T6 may be turned off. The third transistor T3 may be turned off in the anode initialization period PAINI of the first mode M1, but may be turned on in the anode initialization period PAINI of the second mode M2.

Figure 16:
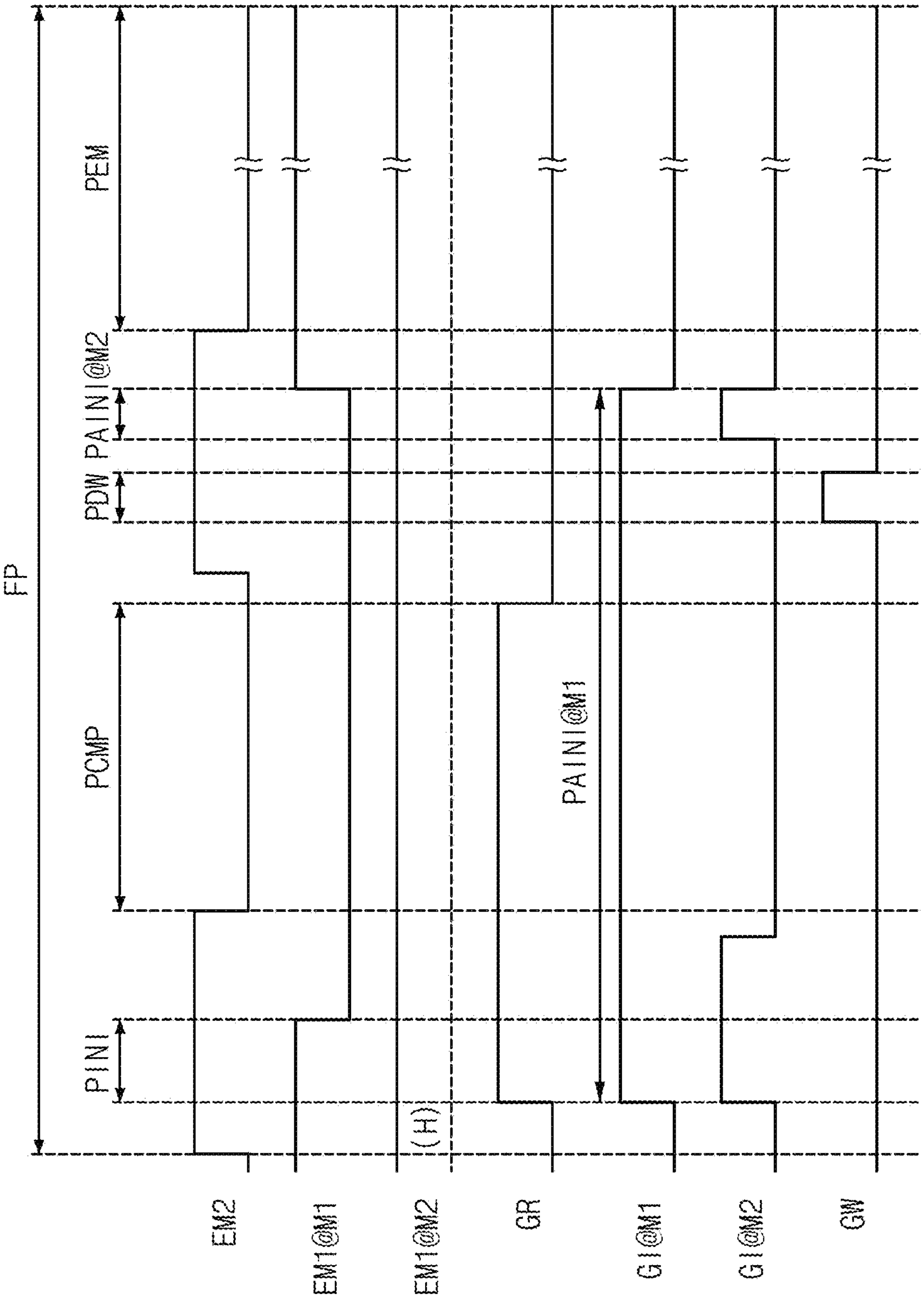
FIG. 16 is a timing diagram for describing still another example of operations of a pixel in first and second modes according to embodiments.

FIG. 16 is a timing diagram for describing still another example of operations of a pixel in first and second modes according to embodiments.

Referring to FIGS. 1 and 16, a frame period FP for the pixel 100 of the display device may include the initialization period PINI, the compensation period PCMP, the data writing period PDW, an anode initialization period PAINI@M1 and PAINI@M2 and the emission period PEM. The first emission signal EM1@M1 and EM1@M2, the second emission signal EM2, the first gate signal GW and the second gate signal GR illustrated in FIG. 16 may be the same as or substantially the same as the first emission signal EM1@M1 and EM1@M2, the second emission signal EM2, the first gate signal GW and the second gate signal GR illustrated in FIG. 14.

Similar to the third gate signal GI illustrated in FIG. 14, the third gate signal GI@M2 in the second mode M2 illustrated in FIG. 16 may have the high level in the initialization period PINI, and also may have the high level in the anode initialization period PAINI@M2 between the data writing period PDW and the emission period PEM. Thus, in the second mode M2, the fifth transistor T5 may be turned on not only in the initialization period PINI but also in the anode initialization period PAINI@M2 between the data writing period PDW and the emission period PEM, and the anode electrode of the light-emitting element EL may be initialized based on the initialization voltage VINT not only in the initialization period PINI but also in the anode initialization period PAINI between the data writing period PDW and the emission period PEM.

However, unlike the third gate signal GI illustrated in FIG. 14, the third gate signal GI@M1 in the first mode M1 illustrated in FIG. 16 may be maintained at the high level from a start time point of the initialization period PINI to a time point between the data writing period PDW and the emission period PEM. For example, the embodiment of FIG. 16 keeps the third gate signal GI continuously high across multiple periods (initialization, compensation, and data writing) without interruption, unlike the segmented timing shown in FIG. 14. Thus, the anode initialization period PAINI@M1 in the first mode M1 may overlap the initialization period PINI, the compensation period PCMP and the data writing period PDW. Accordingly, in the first mode M1, the fifth transistor T5 may be turned on in the anode initialization period PAINI@M1 overlapping the initialization period PINI, the compensation period PCMP and the data writing period PDW, and the anode electrode of the light-emitting element EL may be initialized based on the initialization voltage VINT in the anode initialization period PAINI@M1 overlapping the initialization period PINI, the compensation period PCMP and the data writing period PDW.

Figure 17:
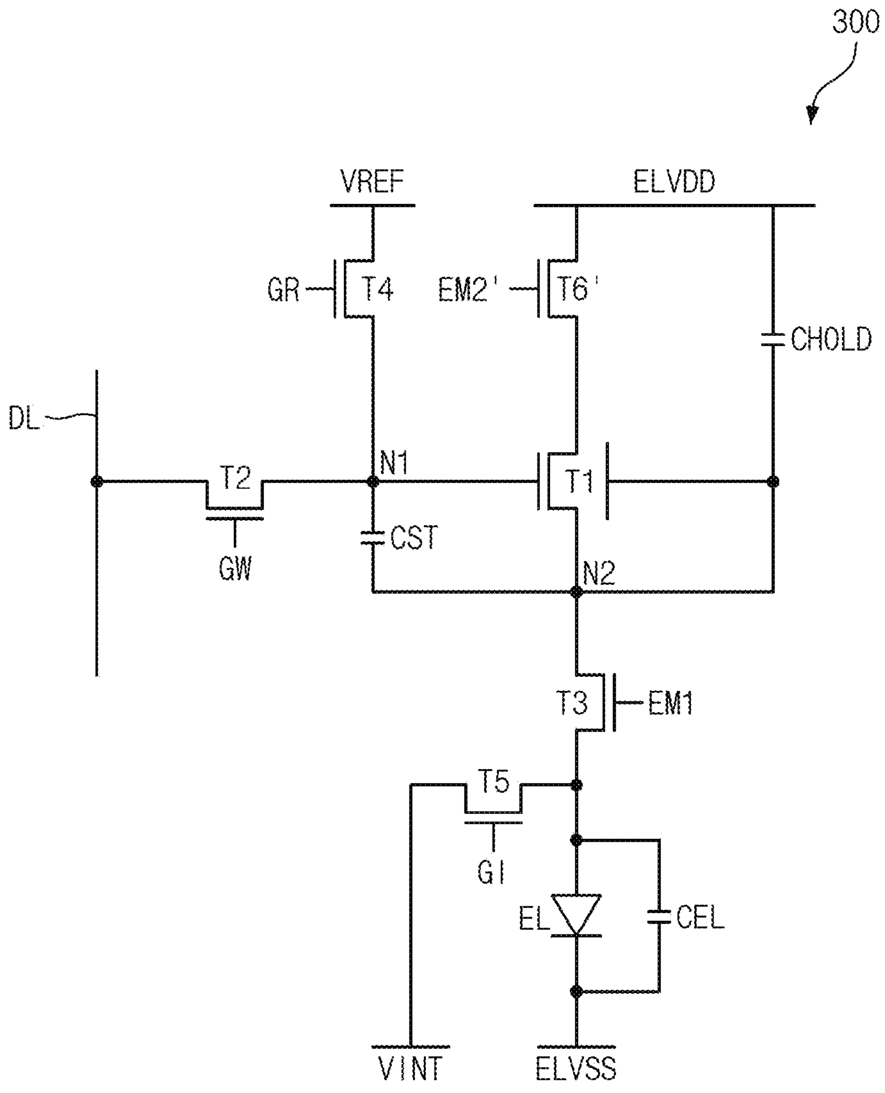
FIG. 17 is a circuit diagram illustrating a pixel of a display device according to embodiments.
Figure 18:
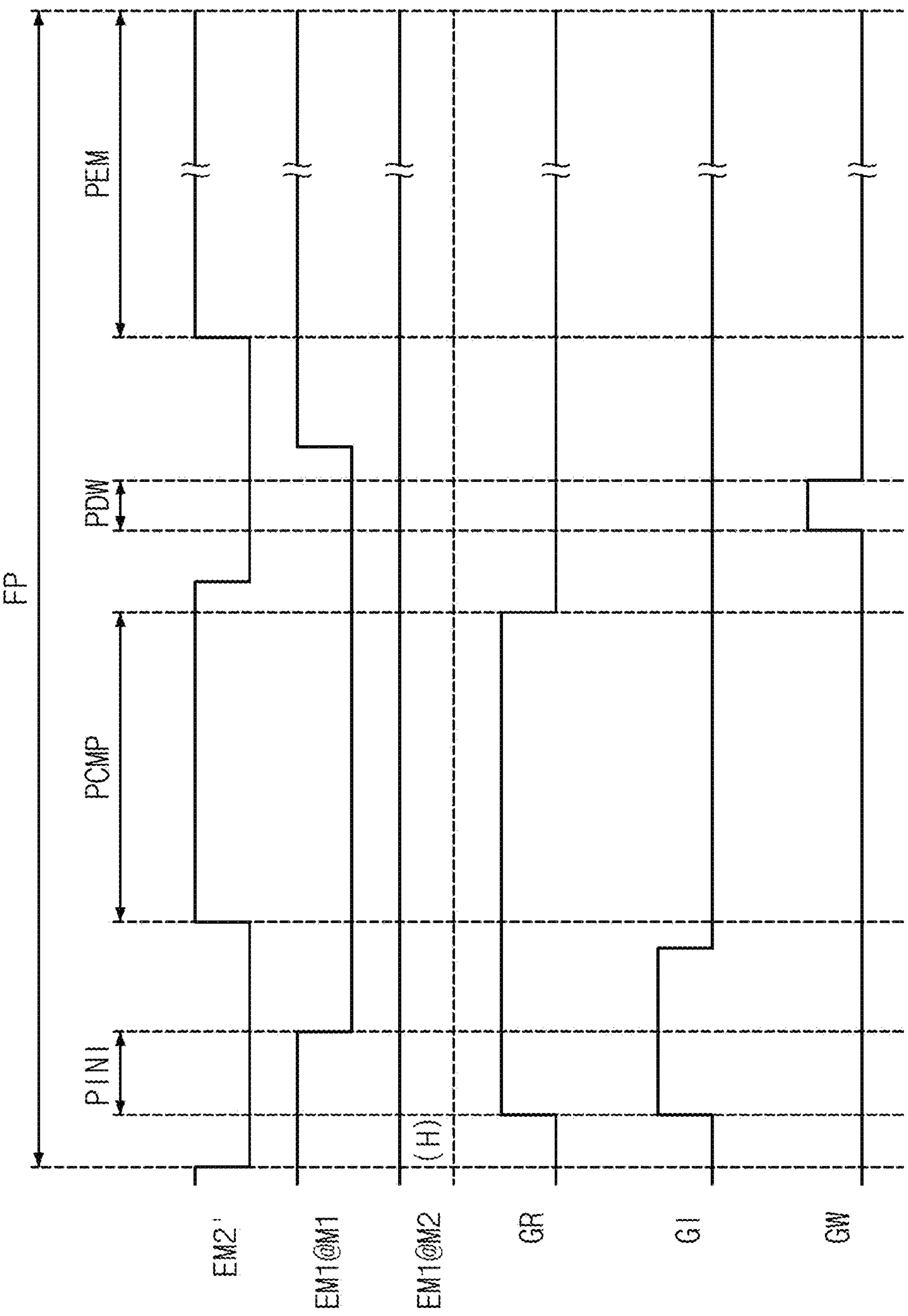
FIG. 18 is a timing diagram for describing an example of operations of a pixel in first and second modes according to embodiments.

FIG. 17 is a circuit diagram illustrating a pixel of a display device according to embodiments, and FIG. 18 is a timing diagram for describing an example of operations of the pixel of FIG. 17 in first and second modes according to embodiments.

Referring to FIG. 17, a pixel 300 of a display device according to embodiments may include a first capacitor CST, a second capacitor CHOLD, a first transistor T1, a second transistor T2, a third transistor T3, a fourth transistor T4, a fifth transistor T5, a sixth transistor T6' and a light-emitting element EL. The pixel 300 of FIG. 17 may have substantially the same structure and substantially the same operation as a pixel 100 of FIG. 1, except that the sixth transistor T6' is an NMOS transistor. Further, as illustrated in FIGS. 17 and 18, a second emission signal EM2' applied to the sixth transistor T6' may have a low level in an initialization period PINI and a data writing period PDW, and may have a high level in a compensation period PCMP and an emission period PEM. For example, in the initialization period PINI, the second emission signal EM2' may have a low level, and the sixth transistor T6' may be turned off in response to the second emission signal EM2' having the low level. In the compensation period PCMP, the second emission signal EM2' may have a high level, turning on the sixth transistor T6' to apply the first power supply voltage ELVDD to the first terminal of the first transistor T1. In the data writing period PDW, the second emission signal EM2' may have a low level again, and thus the sixth transistor T6' may be turned off. During the emission period PEM, the second emission signal EM2' may have a high level, thereby turning on the sixth transistor T6'.

In some embodiments, the first, second, third, fourth, fifth and sixth transistors T1, T2, T3, T4, T5 and T6' are NMOS transistors, and may be oxide transistors. Thus, the pixel 300 of FIG. 17 may be referred to as an all oxide pixel including only oxide transistors.

Figure 19:
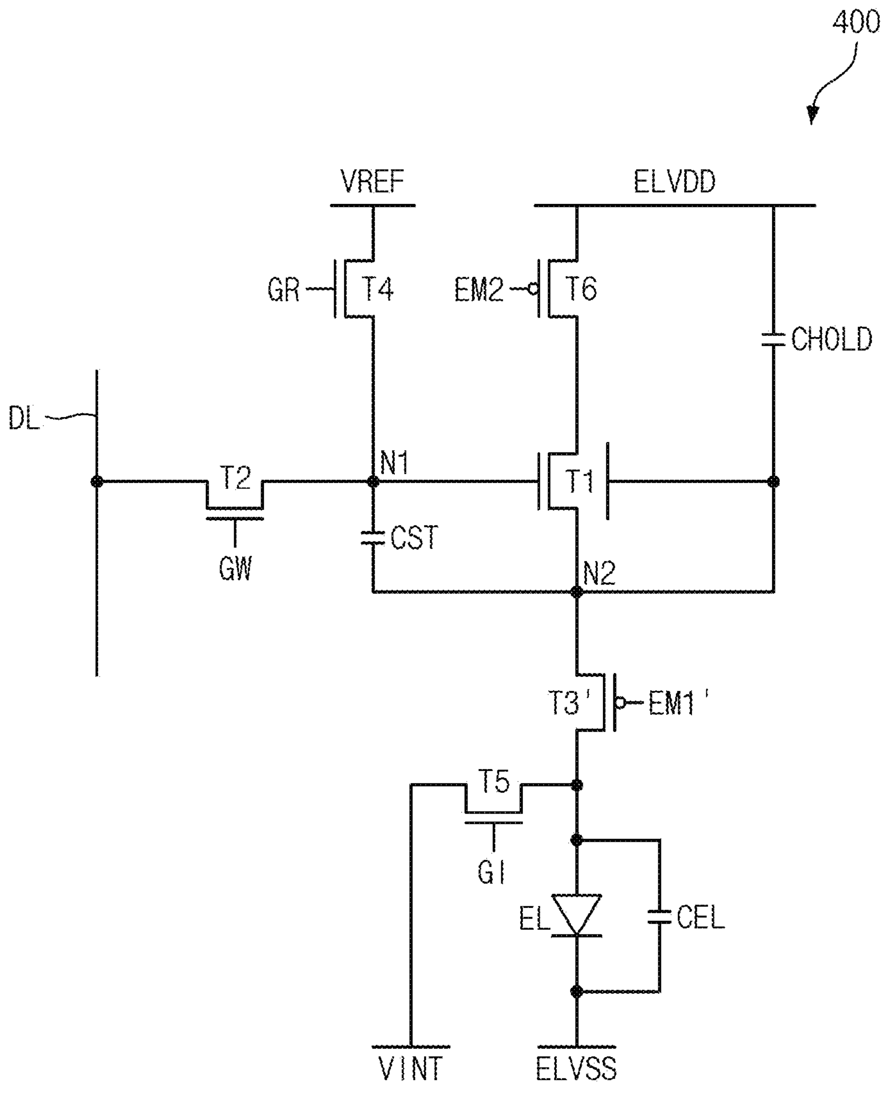
FIG. 19 is a circuit diagram illustrating a pixel of a display device according to an embodiment.
Figure 20:
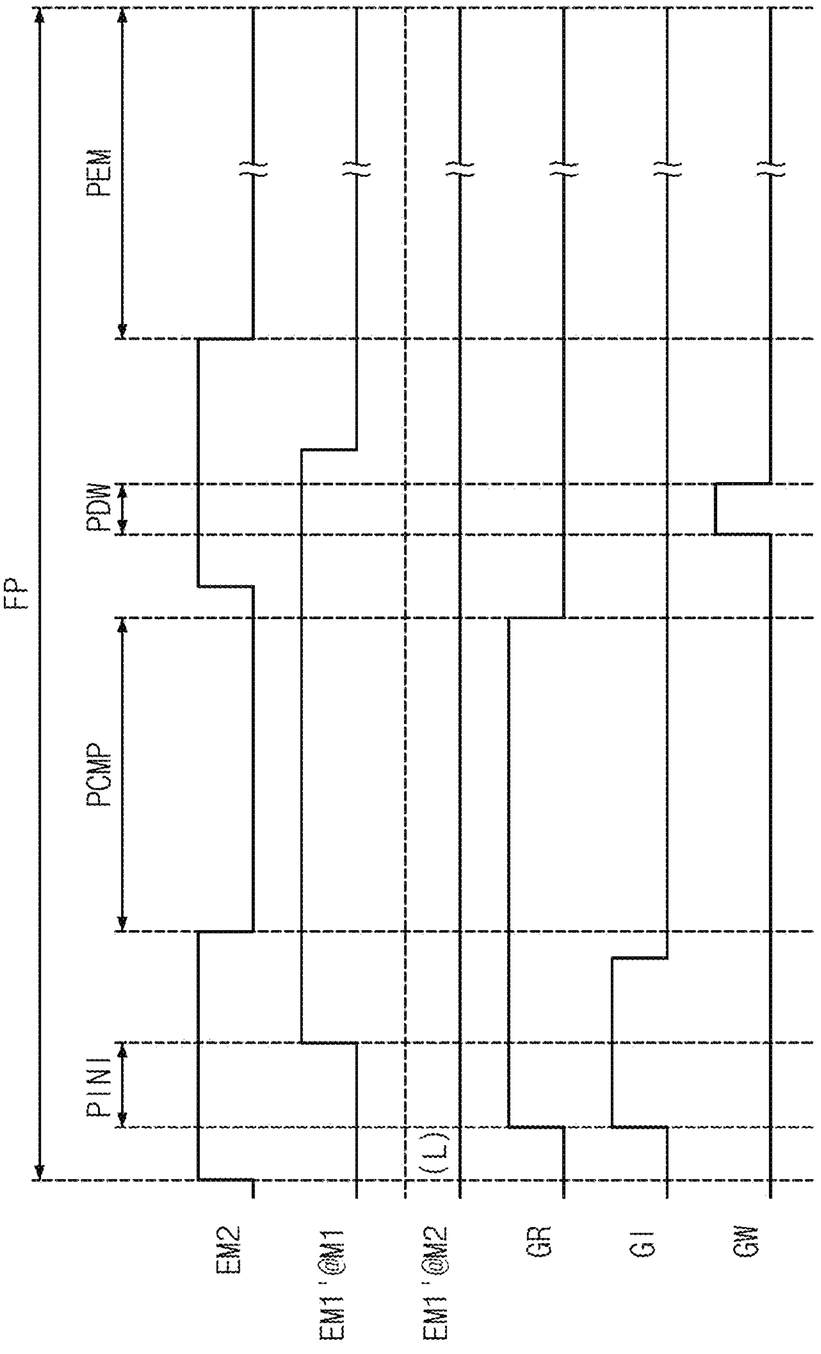
FIG. 20 is a timing diagram for describing an example of operations of a pixel in first and second modes according to embodiments.

FIG. 19 is a circuit diagram illustrating a pixel of a display device according to embodiments, and FIG. 20 is a timing diagram for describing an example of operations of the pixel of FIG. 19 in first and second modes according to embodiments.

Referring to FIG. 19, a pixel 400 of a display device according to embodiments may include a first capacitor CST, a second capacitor CHOLD, a first transistor T1, a second transistor T2, a third transistor T3', a fourth transistor T4, a fifth transistor T5, a sixth transistor T6 and a light-emitting element EL. The pixel 400 of FIG. 19 may have substantially the same structure and substantially the same operation as a pixel 100 of FIG. 1, except that the third transistor T3' is a PMOS transistor. Further, as illustrated in FIGS. 19 and 20, a first emission signal EM1'@M1 applied to the third transistor T3' in a first mode M1 may have a low level in an initialization period PINI and an emission period PEM, and may have a high level in a compensation period PCMP and a data writing period PDW. In addition, the first emission signal EM1'@M2 applied to the third transistor T3' in a second mode M2 may have a low level L in the entire period of the frame period FP.

In some embodiments, the first, second, fourth and fifth transistors T1, T2, T4 and T5 are NMOS transistors, and the third and sixth transistors T3' and T6 are PMOS transistors.

Although FIG. 1 illustrates an example of the pixel 100 in which the sixth transistor T6 is a PMOS transistor, FIG. 17 illustrates an example of a pixel 300 that does not have a PMOS transistor, and FIG. 19 illustrates an example of the pixel 400 in which the third and sixth transistors T3' and T6 are PMOS transistors, pixels supported by the present disclosure are not limited to the examples of FIGS. 1, 17 and 19. For example, the first transistor T1 may be an NMOS transistor, and each of the second, third, fourth, fifth and sixth transistors T2, T3', T4, T5 and T6 may be any one of a PMOS transistor or an NMOS transistor.

Figure 21:
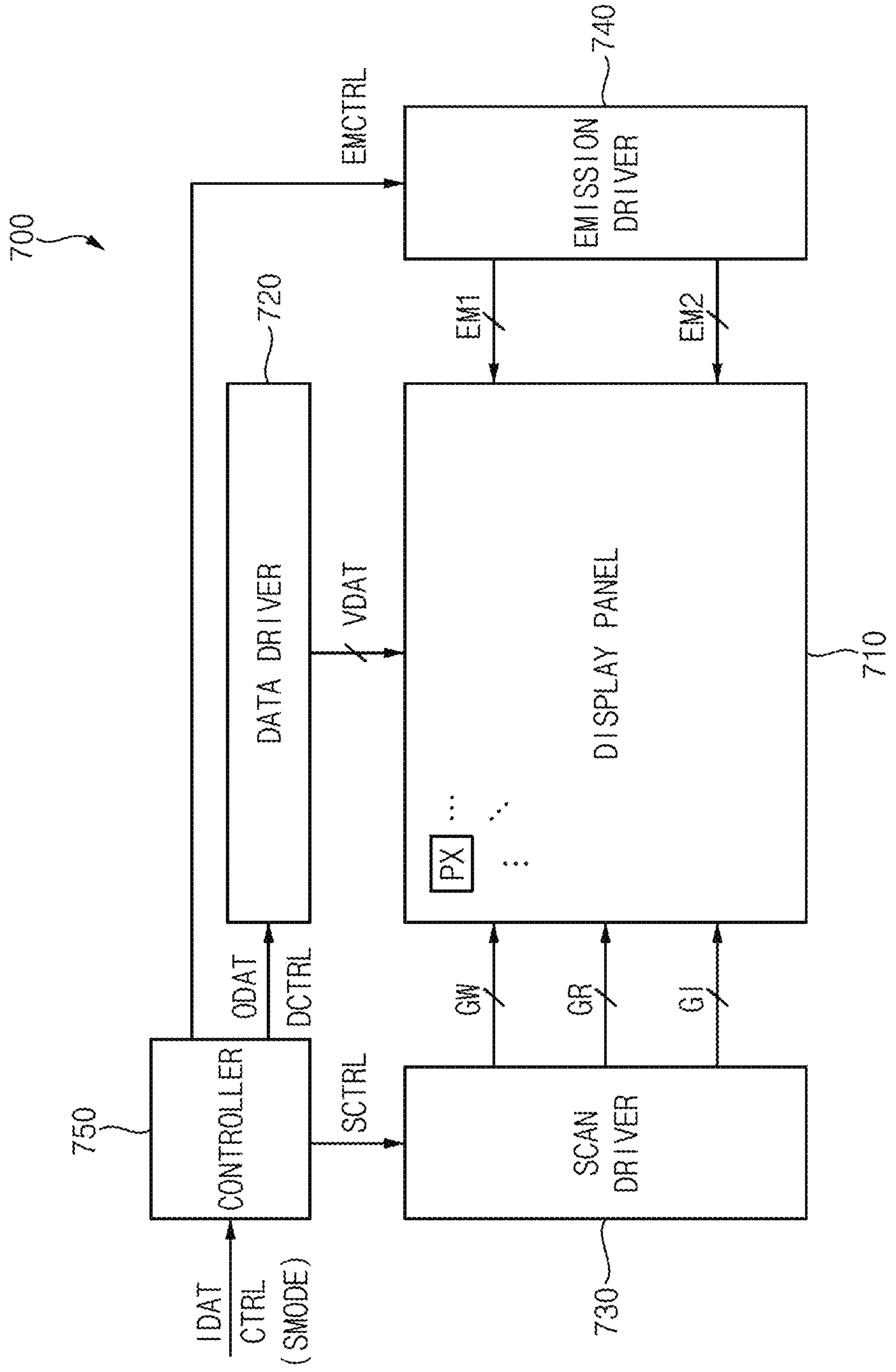
FIG. 21 is a block diagram illustrating a display device according to an embodiment.

FIG. 21 is a block diagram illustrating a display device according to an embodiment.

Referring to FIG. 21, a display device 700 according to embodiments may include a display panel 710, a data driver 720 (e.g., a first driver circuit), a scan driver 730 (e.g., a second driver circuit), an emission driver 740 (e.g., a third driver circuit) and a controller 750 (e.g., a controller circuit).

The display panel 710 may include a plurality of pixels PX. According to embodiments, each pixel PX of the display panel 710 may be a pixel 100 of FIG. 1, a pixel 300 of FIG. 17, a pixel 400 of FIG. 19, or a pixel having a similar structure.

The data driver 720 may provide data voltages VDAT to the plurality of pixels PX based on a data control signal DCTRL and output image data ODAT received from the controller 750. The data control signal DCTRL may include, but is not limited to, an output data enable signal, a horizontal start signal and a load signal. In some embodiments, the data driver 720 and the controller 750 may be implemented as a single integrated circuit, and the single integrated circuit may be referred to as a timing controller embedded data driver ("TED") integrated circuit. In other embodiments, the data driver 720 and the controller 750 may be implemented as separate integrated circuits.

The scan driver 730 may provide first gate signals GW, second gate signals GR, and third gate signals GI to the plurality of pixels PX based on a scan control signal SCTRL received from the controller 750. The scan control signal SCTRL may include, but is not limited to, a scan start signal and a scan clock signal. In some embodiments, the scan driver 730 may be integrated or formed in the display panel 710. In other embodiments, the scan driver 730 may be implemented as one or more integrated circuits.

The emission driver 740 may provide first emission signals EM1 and second emission signals EM2 to the plurality of pixels PX based on an emission control signal EMCTRL received from the controller 750. The emission control signal EMCTRL may include, but is not limited to, an emission start signal and an emission clock signal. In some embodiments, the emission driver 740 may be integrated or formed in the display panel 710. In other embodiments, the emission driver 740 may be implemented as one or more integrated circuits.

The controller 750 (e.g., a timing controller) may receive input image data IDAT and a control signal CTRL from an external processor (e.g., a graphics processing unit ("GPU"), an application processor ("AP") or a graphics card). The control signal CTRL may include a mode signal SMODE indicating a first mode or a second mode. In some embodiments, the first mode may be a normal mode, and the second mode may be a high brightness mode. Further, in some embodiments, the control signal CTRL may further include, but is not limited to, a vertical synchronization signal, a horizontal synchronization signal, an input data enable signal, a master clock signal, etc. The controller 750 may generate the output image data ODAT, the data control signal DCTRL, the scan control signal SCTRL and the emission control signal EMCTRL based on the input image data IDAT and the control signal CTRL. The controller 750 may control the data driver 720 by providing the output image data ODAT and the data control signal DCTRL to the data driver 720, may control the scan driver 730 by providing the scan control signal SCTRL to the scan driver 730, and may control the emission driver 740 by providing the emission control signal EMCTRL to the emission driver 740.

In the display device 700 according to embodiments, when the mode signal SMODE indicates the first mode, a third transistor of each pixel PX may be turned off while the data voltage VDAT is applied to a first node (e.g., N1) through a data line and a second transistor. However, when the mode signal SMODE indicates the second mode, the third transistor of each pixel PX may be turned on while the data voltage VDAT is applied to the first node through the data line and the second transistor. Thus, in the second mode, not only a second capacitor but also the capacitance of a light-emitting element may be used, and a capacitance of the second capacitor may be reduced compared with a conventional pixel. Accordingly, a luminance sensitivity of the pixel PX according to a voltage variation (or a voltage fluctuation) may be enhanced or reduced.

Figure 22:
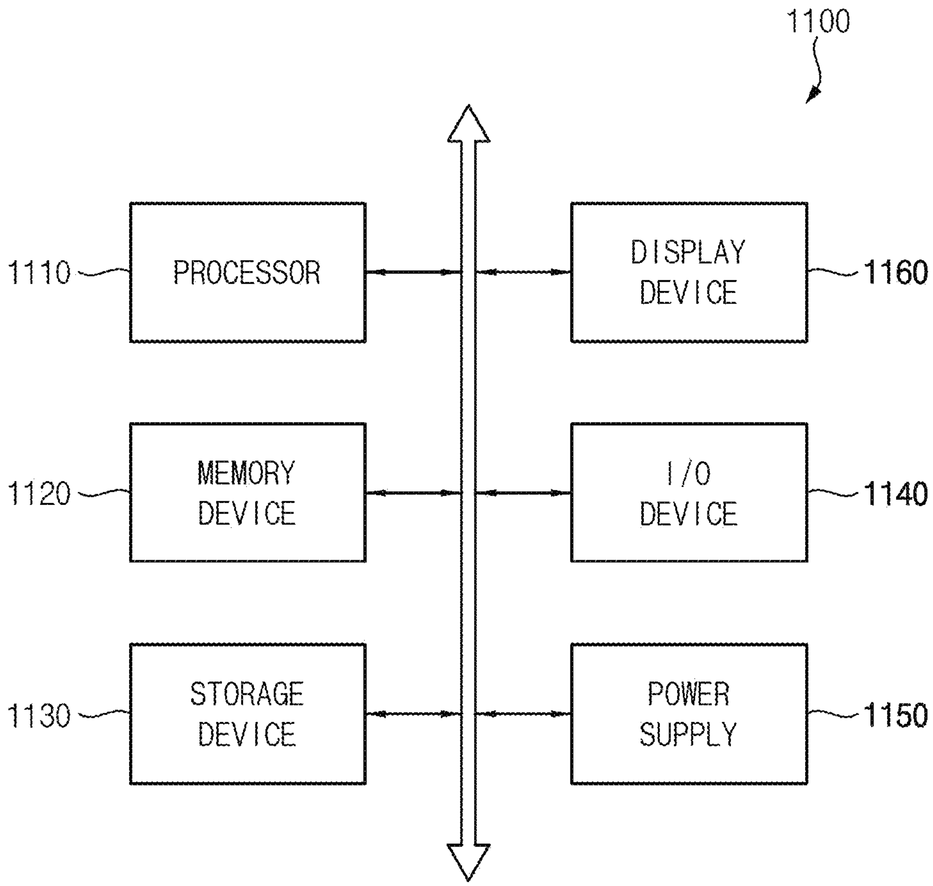
FIG. 22 is a block diagram illustrating an electronic device including a display device according to an embodiment.

FIG. 22 is a block diagram illustrating an electronic device including a display device according to embodiments.

Referring to FIG. 22, an electronic device 1100 may include a processor 1110, a memory device 1120, a storage device 1130, an input/output (I/O) device 1140, a power supply 1150 and a display device 1160. The electronic device 1100 may further include a plurality of ports for communicating with a video card, a sound card, a memory card, a universal serial bus ("USB") device, other electric devices, etc.

The processor 1110 may perform various computing functions or tasks. The processor 1110 may be an application processor ("AP"), a micro-processor, a central processing unit ("CPU"), etc. The processor 1110 may be coupled to other components via an address bus, a control bus, a data bus, etc. Further, in some embodiments, the processor 1110 may be further coupled to an extended bus such as a peripheral component interconnection ("PCI") bus.

The memory device 1120 may store data for operations of the electronic device 1100. For example, the memory device 1120 may include at least one non-volatile memory device such as an erasable programmable read-only memory ("EPROM") device, an electrically erasable programmable read-only memory ("EEPROM") device, a flash memory device, a phase change random access memory ("PRAM") device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or at least one volatile memory device such as a dynamic random access memory ("DRAM") device, a static random access memory ("SRAM") device, a mobile dynamic random access memory ("mobile DRAM") device, etc.

The storage device 1130 may be a solid state drive ("SSD") device, a hard disk drive ("HDD") device, a compact disc-read only memory ("CD-ROM") device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In each pixel of the display device 1160, a third transistor (e.g., an emission path switch) connected between a second capacitor (e.g., a hold capacitor) and an anode electrode may be turned off when a data voltage is provided to the pixel in a first mode (e.g., a normal mode), and may be turned on when the data voltage is provided to the pixel in a second mode (e.g., a high brightness mode). Thus, in the second mode, not only the second capacitor but also a capacitance of a light-emitting element may be used, and a capacitance of the second capacitor may be reduced compared with a conventional pixel. Accordingly, a luminance sensitivity according to a voltage variation (or a voltage fluctuation) may be enhanced or reduced.

The inventive concepts may be applied any electronic device 1100 including the display device 1160. For example, the inventive concepts may be applied to a virtual reality ("VR") device, an augmented reality ("AR") device, a mixed reality ("MR") device, an extended reality ("XR") device, a mobile phone, a smart phone, a television ("TV") (e.g., a digital TV, a three-dimensional ("3D") TV, etc.), a wearable electronic device, a personal computer ("PC") (e.g. a laptop computer, a tablet computer, etc.), a home appliance, a personal digital assistant ("PDA"), a portable multimedia player ("PMP"), a digital camera, a music player, a portable game console, a navigation device, etc.

At least one embodiment of the disclosure provides a pixel of a display device that includes a first transistor having a first gate connected to a first node, a first terminal receiving a first power supply voltage, and a second terminal connected to a second node. A first capacitor is connected between the first and second nodes. A second capacitor is connected between the first power supply voltage and the second node. A second transistor transfers a data voltage to the first node. A third transistor selectively connects the second node to an anode electrode of a light-emitting element based on a first emission signal. In a first mode, during data writing, the third transistor is turned off, and the first transistor generates an emission current independent of the capacitance of the light-emitting element. In a second mode, the third transistor is turned on, and the emission current depends on the capacitance of the light-emitting element, thereby enhancing luminance sensitive.

Figure 23:
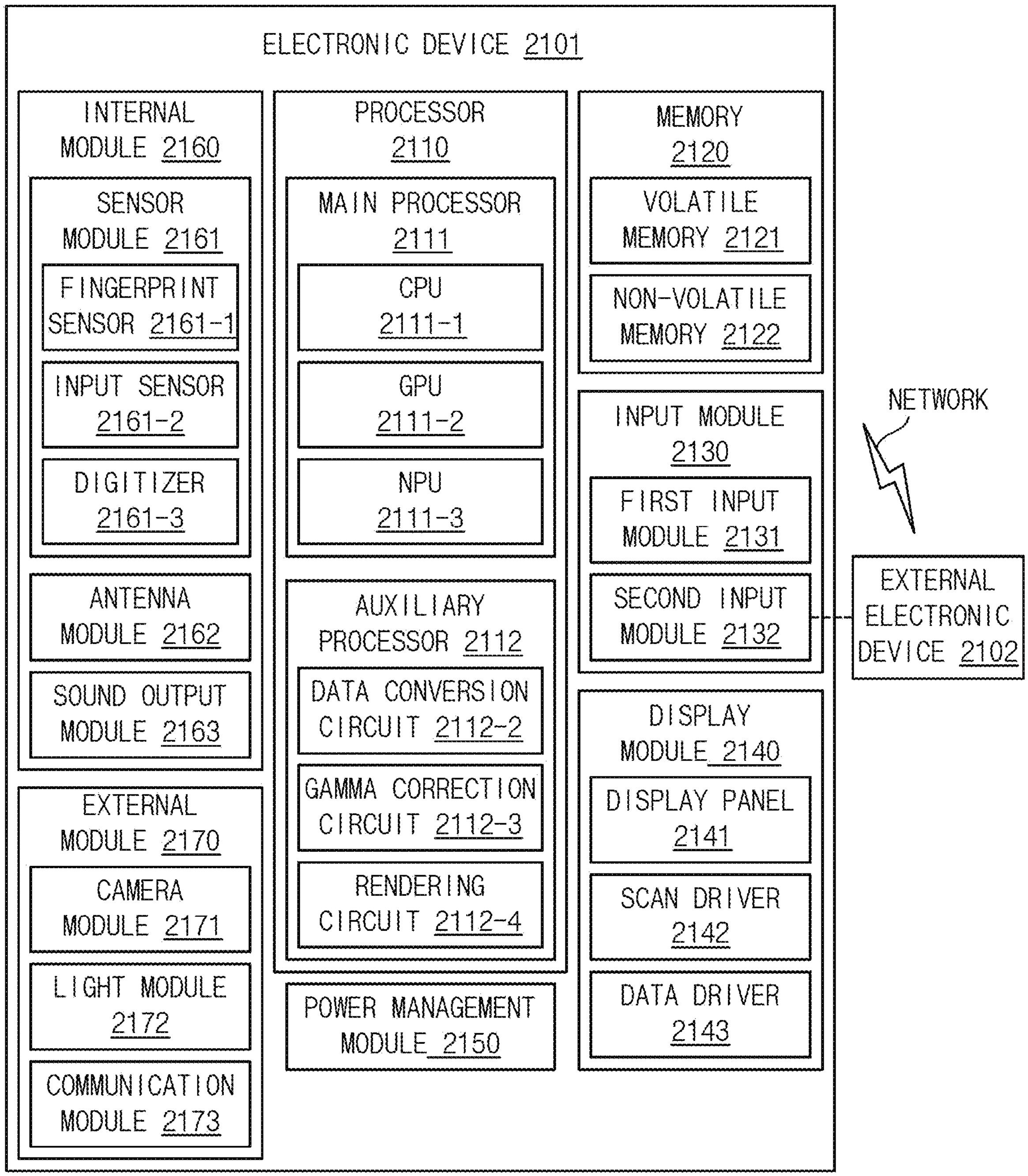
FIG. 23 is a block diagram illustrating an example of an electronic device according to an embodiment.

FIG. 23 is a block diagram illustrating an example of an electronic device according to embodiments.

An electronic device 2101 may output various information via a display module 2140 in an operating system. When a processor 2110 executes an application stored in a memory 2120, the display module 2140 may provide application information to a user via a display panel 2141.

The processor 2110 may obtain an external input via an input module 2130 or a sensor module 2161 and may execute an application corresponding to the external input. For example, when the user selects a camera icon displayed on the display panel 2141, the processor 2110 may obtain a user input via an input sensor 2161-2 and may activate a camera module 2171. The processor 2110 may transfer image data corresponding to an image captured by the camera module 2171 to the display module 2140. The display module 2140 may display an image corresponding to the captured image via the display panel 2141.

As another example, when personal information authentication is executed in the display module 2140, a fingerprint sensor 2161-1 may obtain input fingerprint information as input data. The processor 2110 may compare the input data obtained by the fingerprint sensor 2161-1 with authentication data stored in the memory 2120, and may execute an application according to the comparison result. The display module 2140 may display information executed according to application logic via the display panel 2141.

As still another example, when a music streaming icon displayed on the display module 2140 is selected, the processor 2110 obtains a user input via the input sensor 2161-2 and may activate a music streaming application stored in the memory 2120. When a music execution command is input in the music streaming application, the processor 2110 may activate a sound output module 2163 to provide sound information corresponding to the music execution command to the user.

In the above, an operation of the electronic device 2101 has been briefly described. Hereinafter, a configuration of the electronic device 2101 will be described in detail. Some components of the electronic device 2101 described below may be integrated and provided as one component, or one component may be provided separately as two or more components.

Referring to FIG. 23, the electronic device 2101 may communicate with an external electronic device 2102 via a network (e.g., a short-range wireless communication network or a long-range wireless communication network). In some embodiments, the electronic device 2101 may include the processor 2110, the memory 2120, the input module 2130, the display module 2140, a power management module 2150, an internal module 2160 and an external module 2170. In some embodiments, at least one of the components may be omitted from the electronic device 2101, or one or more other components may be added in the electronic device 2101. In some embodiments, some of the components (e.g., the sensor module 2161, an antenna module 2162, or the sound output module 2163) may be implemented as a single component (e.g., the display module 2140).

The processor 2110 may execute software to control at least one other component (e.g., a hardware or software component) of the electronic device 2101 coupled with the processor 2110, and may perform various data processing or computation. According to some embodiments, as at least part of the data processing or computation, the processor 2110 may store a command or data received from another component (e.g., the input module 2130, the sensor module 2161 or a communication module 2173) in a volatile memory 2121, may process the command or the data stored in the volatile memory 2121, and may store resulting data in a non-volatile memory 2122.

The processor 2110 may include a main processor 2111 and an auxiliary processor 2112. The main processor 2111 may include one or more of a central processing unit ("CPU") 2111-1 or an application processor ("AP"). The main processor 2111 may further include any one or more of a graphics processing unit ("GPU") 2111-2, a communication processor ("CP"), and an image signal processor ("ISP"). The main processor 2111 may further include a neural processing unit ("NPU") 2111-3. The NPU 2111-3 may be a processor specialized in processing an artificial intelligence model, and the artificial intelligence model may be generated through machine learning. The artificial intelligence model may include a plurality of artificial neural network layers. The artificial neural network may be a deep neural network ("DNN"), a convolutional neural network ("CNN"), a recurrent neural network ("RNN"), a restricted Boltzmann machine ("RBM"), a deep belief network ("DBN"), a bidirectional recurrent deep neural network ("BRDNN"), deep Q-network or a combination of two or more thereof, but is not limited thereto. The artificial intelligence model may, additionally or alternatively, include a software structure other than a hardware structure. At least two of the above-described processing units and processors may be implemented as an integrated component (e.g., a single chip), or respective processing units and processors may be implemented as independent components (e.g., a plurality of chips).

The auxiliary processor 2112 may include a controller. The controller included in the auxiliary processor 2112 may correspond to a controller 750 illustrated in FIG. 21. The controller may include an interface conversion circuit and a timing control circuit. The controller may receive an image signal from the main processor 2111, may convert a data format of the image signal to meet interface specifications with the display module 2140, and may output image data. The controller may output various control signals required for driving the display module 2140.

The auxiliary processor 2112 may further include a data conversion circuit 2112-2, a gamma correction circuit 2112-3, a rendering circuit 2112-4, or the like. The data conversion circuit 2112-2 may receive image data from the controller. The data conversion circuit 2112-2 may compensate for the image data such that an image is displayed with a desired luminance according to characteristics of the electronic device 2101 or the user's setting, or may convert the image data to reduce power consumption or to eliminate an after-image. The gamma correction circuit 2112-3 may convert image data or a gamma reference voltage so that an image displayed on the electronic device 2101 has desired gamma characteristics. The rendering circuit 2112-4 may receive image data from the controller, and may render the image data in consideration of a pixel arrangement of the display panel 2141 in the electronic device 2101. At least one of the data conversion circuit 2112-2, the gamma correction circuit 2112-3 and the rendering circuit 2112-4 may be integrated in another component (e.g., the main processor 2111 or the controller). At least one of the data conversion circuit 2112-2, the gamma correction circuit 2112-3 and the rendering circuit 2112-4 may be integrated in a data driver 2143 described below.

The memory 2120 may store various data used by at least one component (e.g., the processor 2110 or the sensor module 2161) of the electronic device 2101. The various data may include, for example, input data or output data for a command related thereto. The memory 2120 may include at least one of the volatile memory 2121 and the non-volatile memory 2122.

The input module 2130 may receive a command or data to be used by the components (e.g., the processor 2110, the sensor module 2161, or the sound output module 2163) of the electronic device 2101 from the outside of the electronic device 2101 (e.g., the user or the external electronic device 2102).

The input module 2130 may include a first input module 2131 for receiving a command or data from the user, and a second input module 2132 for receiving a command or data from the external electronic device 2102. The first input module 2131 may include a microphone, a mouse, a keyboard, a key (e.g., a button) or a pen (e.g., a passive pen or an active pen). The second input module 2132 may support a designated protocol capable of connecting the electronic device 2101 to the external electronic device 2102 by wire or wirelessly. In some embodiments, the second input module 2132 may include a high definition multimedia interface ("HDMI"), a universal serial bus ("USB") interface, an SD card interface or an audio interface. The second input module 2132 may include a connector that may physically connect the electronic device 2101 to the external electronic device 2102. For example, the second input module 2132 may include an HDMI connector, a USB connector, an SD card connector or an audio connector (e.g., a headphone connector).

The display module 2140 may visually provide information to the user. The display module 2140 may include the display panel 2141, a scan driver 2142 and the data driver 2143. The display module 2140 may further include a window, a chassis and a bracket for protecting the display panel 2141.

The display panel 2141 may include a plurality of pixels. In each pixel, a third transistor (e.g., an emission path switch) connected between a second capacitor (e.g., a hold capacitor) and an anode electrode may be turned off when a data voltage is provided to the pixel in a first mode (e.g., a normal mode), and may be turned on when the data voltage is provided to the pixel in a second mode (e.g., a high brightness mode). Thus, in the second mode, not only the second capacitor but also a capacitance of a light-emitting element may be used, and a capacitance of the second capacitor may be reduced compared with a conventional pixel. Accordingly, a luminance sensitivity according to a voltage variation (or a voltage fluctuation) may be enhanced or reduced.

The display panel 2141 may include a liquid crystal display panel, an organic light-emitting display panel or an inorganic light-emitting display panel, but the type of the display panel 2141 is not limited thereto. The display panel 2141 may be a rigid type display panel, or a flexible type display panel capable of being rolled or folded. The display module 2140 may further include a supporter, a bracket or a heat dissipation member that supports the display panel 2141.

The scan driver 2142 may be mounted on the display panel 2141 as a driving chip. Alternatively, the scan driver 2142 may be integrated into the display panel 2141. For example, the scan driver 2142 may include an amorphous silicon TFT gate driver circuit ("ASG"), a low temperature polycrystalline silicon ("LTPS") TFT gate driver circuit or an oxide semiconductor TFT gate driver circuit ("OSG") embedded in the display panel 2141. The scan driver 2142 may receive a control signal from the controller and may output scan signals to the display panel 2141 in response to the control signal.

The display panel 2141 may further include an emission driver. The emission driver may output an emission control signal to the display panel 2141 in response to a control signal received from the controller. The emission driver may be formed separately from the scan driver 2142, or may be integrated into the scan driver 2142.

The data driver 2143 may receive a control signal from the controller, may convert image data into analog voltages (e.g., data voltages) in response to the control signal, and then may output the data voltages to the display panel 2141.

The data driver 2143 may be incorporated into other components (e.g., the controller). Further, the functions of the interface conversion circuit and the timing control circuit of the controller described above may be integrated into the data driver 2143.

The display module 2140 may further include a voltage generator circuit, or the like. The voltage generator circuit may output various voltages used to drive the display panel 2141.

The power management module 2150 may supply power to the components of the electronic device 2101. The power management module 2150 may include a battery that charges a power supply voltage. The battery may include a primary cell which is not rechargeable, a secondary cell which is rechargeable, or a fuel cell. The power management module 2150 may include a power management integrated circuit ("PMIC"). The PMIC may supply optimal power to each of the modules described above and modules described below. The power management module 2150 may include a wireless power transmission/reception member electrically connected to the battery. The wireless power transmission/reception member may include a plurality of antenna radiators in the form of coils.

The electronic device 2101 may further include the internal module 2160 and the external module 2170. The internal module 2160 may include the sensor module 2161, the antenna module 2162 and the sound output module 2163. The external module 2170 may include the camera module 2171, a light module 2172 and the communication module 2173.

The sensor module 2161 may detect an input by the user's body or an input by the pen of the first input module 2131, and may generate an electrical signal or data value corresponding to the input. The sensor module 2161 may include at least one of the fingerprint sensor 2161-1, the input sensor 2161-2 and a digitizer 2161-3.

The fingerprint sensor 2161-1 may generate a data value corresponding to the user's fingerprint. The fingerprint sensor 2161-1 may include any one of an optical type fingerprint sensor and a capacitive type fingerprint sensor.

The input sensor 2161-2 may generate a data value corresponding to coordinate information of the user's body input or the pen input. The input sensor 2161-2 may convert a capacitance change caused by the input into the data value. The input sensor 2161-2 may detect the input by the passive pen, or may transfer/receive data to/from the active pen.

The input sensor 2161-2 may measure a bio-signal, such as blood pressure, moisture or body fat. For example, when a portion of the body of the user touches a sensor layer or a sensing panel, and does not move for a certain period of time, the input sensor 2161-2 may output information desired by the user to the display module 2140 by detecting the bio-signal based on a change in electric field due to the portion of the body.

The digitizer 2161-3 may generate a data value corresponding to coordinate information of the input by the pen. The digitizer 2161-3 may convert an amount of an electromagnetic change caused by the input into the data value. The digitizer 2161-3 may detect the input by the passive pen, or may transfer/receive data to/from the active pen.

At least one of the fingerprint sensor 2161-1, the input sensor 2161-2 and the digitizer 2161-3 may be implemented as a sensor layer formed on the display panel 2141 through a continuous process. The fingerprint sensor 2161-1, the input sensor 2161-2 and the digitizer 2161-3 may be disposed above the display panel 2141, or at least one of the fingerprint sensor 2161-1, the input sensor 2161-2 and the digitizer 2161-3 may be disposed below the display panel 2141.

Two or more of the fingerprint sensor 2161-1, the input sensor 2161-2 and the digitizer 2161-3 may be integrated into one sensing panel through the same process. When integrated into one sensing panel, the sensing panel may be disposed between the display panel 2141 and a window disposed above the display panel 2141. In some embodiments, the sensing panel may be disposed on the window, but the location of the sensing panel is not limited thereto.

At least one of the fingerprint sensor 2161-1, the input sensor 2161-2 and the digitizer 2161-3 may be embedded in the display panel 2141. In other words, at least one of the fingerprint sensor 2161-1, the input sensor 2161-2 and the digitizer 2161-2 may be simultaneously formed through a process of forming elements (e.g., light-emitting elements, transistors, etc.) included in the display panel 2141.

In addition, the sensor module 2161 may generate an electrical signal or a data value corresponding to an internal state or an external state of the electronic device 2101. The sensor module 2161 may further include, for example, a gesture sensor, a gyro sensor, an atmospheric pressure sensor, a magnetic sensor, an acceleration sensor, a grip sensor, a proximity sensor, a color sensor, an infrared ("IR") sensor, a biometric sensor, a temperature sensor, a humidity sensor or an illuminance sensor.

The antenna module 2162 may include one or more antennas for transmitting or receiving a signal or power to or from the outside. In some embodiments, the communication module 2173 may transfer or receive a signal to or from the external electronic device 2102 through an antenna suitable for a communication method. An antenna pattern of the antenna module 2162 may be integrated into one component (e.g., the display panel 2141) of the display module 2140 or the input sensor 2161-2.

The sound output module 2163 may output sound signals to the outside of the electronic device 2101. The sound output module 2163 may include, for example, a speaker or a receiver. The speaker may be used for general purposes, such as playing multimedia or playing record. The receiver may be used for receiving incoming calls. In some embodiments, the receiver may be implemented as separate from, or as part of the speaker. A sound output pattern of the sound output module 2163 may be integrated into the display module 2140.

The camera module 2171 may capture a still image and a moving image. In some embodiments, the camera module 2171 may include one or more lenses, an image sensor or an image signal processor. The camera module 2171 may further include an infrared camera capable of measuring the presence or absence of the user, the user's location and the user's line of sight.

The light module 2172 may provide light. The light module 2172 may include a light-emitting diode or a xenon lamp. The light module 2172 may operate in conjunction with the camera module 2171, or may operate independently of the camera module 2171.

The communication module 2173 may support establishing a wired or wireless communication channel between the electronic device 2101 and the external electronic device 2102 and performing communication via the established communication channel. The communication module 2173 may include a wireless communication module (e.g., a cellular communication module, a short-range wireless communication module or a global navigation satellite system ("GNSS") communication module) or a wired communication module (e.g., a local area network ("LAN") communication module or a power line communication ("PLC") module). The communication module 2173 may communicate with the external electronic device 2102 via a short-range communication network (e.g., Bluetooth™, wireless-fidelity ("Wi-Fi") direct, or infrared data association ("IrDA")) or a long-range communication network (e.g., a cellular network, the Internet or a computer network (e.g., LAN or wide area network ("WAN"))). These various types of communication modules 2173 may be implemented as a single chip, or may be implemented as multi-chips separate from each other.

The input module 2130, the sensor module 2161, the camera module 2171, and the like may be used to control an operation of the display module 2140 in conjunction with the processor 2110.

The processor 2110 may output a command or data to the display module 2140, the sound output module 2163, the camera module 2171 or the light module 2172 based on input data received from the input module 2130. For example, the processor 2110 may generate image data corresponding to input data applied through a mouse or an active pen, and may output the image data to the display module 2140. Alternatively, the processor 2110 may generate command data corresponding to the input data, and may output the command data to the camera module 2171 or the light module 2172. When no input data is received from the input module 2130 for a certain period of time, the processor 2110 may switch an operation mode of the electronic device 2101 to a low power mode or a sleep mode, thereby reducing power consumption of the electronic device 2101.

The processor 2110 may output a command or data to the display module 2140, the sound output module 2163, the camera module 2171 or the light module 2172 based on sensing data received from the sensor module 2161. For example, the processor 2110 may compare authentication data applied by the fingerprint sensor 2161-1 with authentication data stored in the memory 2120, and then may execute an application according to the comparison result. The processor 2110 may execute a command or output corresponding image data to the display module 2140 based on the sensing data sensed by the input sensor 2161-2 or the digitizer 2161-3. In a case where the sensor module 2161 includes a temperature sensor, the processor 2110 may receive temperature data from the sensor module 2161, and may further perform luminance correction on the image data based on the temperature data.

The processor 2110 may receive measurement data about the presence or absence of the user, the location of the user and the user's line of sight from the camera module 2171. The processor 2110 may further perform luminance correction on the image data based on the measurement data. For example, after the processor 2110 determines the presence or absence of the user based on the input from the camera module 2171, the data conversion circuit 2112-2 or the gamma correction circuit 2112-3 may perform the luminance correction on the image data, and the processor 2110 may provide the luminance-corrected image data to the display module 2140.

At least some of the above-described components may be coupled mutually and communicate signals (e.g., commands or data) therebetween via an inter-peripheral communication scheme (e.g., a bus, general purpose input and output ("GPIO"), serial peripheral interface ("SPI"), mobile industry processor interface ("MIPI") or ultra-path interconnect ("UPI")). The processor 2110 may communicate with the display module 2140 via an agreed interface. Further, any one of the above-described communication methods may be used between the processor 2110 and the display module 2140, but the communication method between the processor 2110 and the display module 2140 is not limited to the above-described communication method.

The electronic device 2101 according to various embodiments described above may be one of various types of devices. For example, the electronic device 2101 may include at least one of a portable communication device (e.g., a smart phone), a computer device, a portable multimedia device, a portable medical device, a camera, a wearable device and a home appliance. However, the electronic device 2101 according to embodiments is not limited to the above-described devices.

The foregoing is illustrative of embodiments and is not to be construed as limiting thereof. Although a few embodiments have been described, those skilled in the art will readily appreciate that many modifications are possible in the embodiments without materially departing from the novel teachings of the present inventive concept. Accordingly, all such modifications are intended to be included within the scope of the present inventive concept as defined in the claims. Therefore, it is to be understood that the foregoing is illustrative of various embodiments and is not to be construed as limited to the specific embodiments disclosed, and that modifications to the disclosed embodiments, as well as other embodiments, are intended to be included within the scope of the appended claims.

What is claimed is:

1. A pixel of a display device, the pixel comprising:

a first transistor including a first gate connected to a first node, a first terminal configured to receive a first power supply voltage, and a second terminal connected to a second node;

a first capacitor including a first electrode connected to the first node, and a second electrode connected to the second node;

a second capacitor including a first electrode configured to receive the first power supply voltage, and a second electrode connected to the second node;

a second transistor including a gate configured to receive a first gate signal, a first terminal connected to a data line, and a second terminal connected to the first node;

a light-emitting element including an anode electrode, and a cathode electrode configured to receive a second power supply voltage;

a third transistor including a gate configured to receive a first emission signal, a first terminal connected to the second node, and a second terminal connected to the anode electrode, the third transistor configured to be turned off while the second transistor is turned on in a first mode, and to be turned on while the second transistor is turned on in a second mode; and a sixth transistor including a gate configured to receive a second emission signal, a first terminal configured to receive the first power supply voltage, and a second terminal connected to the first terminal of the first transistor, wherein the third transistor and the sixth transistor are different types of transistors.

2. The pixel of claim 1, wherein, during a data writing period of the first mode, the second electrode of the first capacitor is connected to the second capacitor, and is separated from the anode electrode, and wherein, during a data writing period of the second mode, the second electrode of the first capacitor is connected to the second capacitor and the anode electrode.

3. The pixel of claim 1, wherein, during an emission period of the first mode, the first transistor generates an emission current based on a voltage independently of a capacitance of the light-emitting element, and wherein, during an emission period of the second mode, the first transistor generates an emission current based on a voltage stored in the first capacitor and dependent upon the capacitance.

4. The pixel of claim 1, wherein, with respect to a same data voltage, an emission current generated by the first transistor in the first mode is less than an emission current generated by the first transistor in the second mode.

5. The pixel of claim 1, wherein an emission current generated by the first transistor in the first mode is determined by an equation $$\text{“}IEL = K\left[\frac{Chold}{Cst + Chold}(VDAT - VREF)\right]^2\text{”},$$

and wherein an emission current generated by the first transistor in the second mode is determined by an equation $$\text{“}IEL = K\left[\frac{Chold + Cel}{Cst + Chold + Cel}(VDAT - VREF)\right]^2\text{”},$$

where IEL is an emission current generated by the first transistor, K is a current coefficient, Cst is a capacitance of the first capacitor, Chold is a capacitance of the second capacitor, VDAT is a data voltage, VREF is a reference voltage, and Cel is a capacitance of the light-emitting element.

6. The pixel of claim 1, wherein the first mode is a normal mode and the second mode is a high brightness mode.

7. The pixel of claim 1, wherein the first transistor is an N-type metal-oxide-semiconductor transistor.

8. The pixel of claim 1, wherein the first transistor further includes a second gate connected to the second node.

9. The pixel of claim 1, further comprising:

a fourth transistor including a gate configured to receive a second gate signal, a first terminal configured to receive a reference voltage, and a second terminal connected to the first node; and a fifth transistor including a gate configured to receive a third gate signal, a first terminal configured to receive an initialization voltage, and a second terminal connected to the anode electrode.

10. The pixel of claim 9, wherein the first, second, third, fourth and fifth transistors are N-type metal-oxide-semiconductor transistors, and wherein the sixth transistor is a P-type metal-oxide-semiconductor transistor.

11. The pixel of claim 9, wherein a frame period for the pixel of the display device includes:

an initialization period in which the first node and the second node are initialized;

a compensation period in which a threshold voltage of the first transistor is stored in the first capacitor;

a data writing period in which a data voltage is transferred to the first node; and an emission period in which the light-emitting element emits light.

12. The pixel of claim 11, wherein, in the first mode, the third transistor is turned off in the compensation period and the data writing period, and is turned on in the initialization period and the emission period, and wherein, in the second mode, the third transistor is turned off in the compensation period, and is turned on in the initialization period, the data writing period and the emission period.

13. The pixel of claim 11, wherein, in the first mode, the third transistor is turned off in the compensation period and the data writing period, and is turned on in the initialization period and the emission period, and wherein, in the second mode, the third transistor is turned on in an entire period of the frame period.

14. The pixel of claim 11, wherein, in each of the first mode and the second mode, the fifth transistor is turned off in the compensation period, the data writing period and the emission period, and is turned on in the initialization period.

15. The pixel of claim 11, wherein, in the first mode, the fifth transistor is turned off in the emission period, and is turned on in the initialization period, the compensation period and the data writing period, and wherein, in the second mode, the fifth transistor is turned off in the compensation period, the data writing period and the emission period, and is turned on in the initialization period.

16. The pixel of claim 11, wherein the frame period further includes:

an anode initialization period in which the anode electrode is initialized.

17. The pixel of claim 16, wherein, in each of the first mode and the second mode, the anode initialization period is between the data writing period and the emission period.

18. The pixel of claim 16, wherein, in the first mode, the anode initialization period overlaps the compensation period and the data writing period, and wherein, in the second mode, the anode initialization period is between the data writing period and the emission period.

19. A display device comprising:

a display panel including a plurality of pixels;

a data driver configured to provide a data voltage to each of the plurality of pixels;

a scan driver configured to provide a first gate signal to each of the plurality of pixels;

an emission driver configured to provide a first emission signal and a second emission signal to each of the plurality of pixels; and a controller configured to receive a mode signal, and to control the data driver, the scan driver and the emission driver, wherein each of the plurality of pixels comprises:

a first transistor including a first gate connected to a first node, a first terminal configured to receive a first power supply voltage, and a second terminal connected to a second node;

a first capacitor including a first electrode connected to the first node, and a second electrode connected to the second node;

a second capacitor including a first electrode configured to receive the first power supply voltage, and a second electrode connected to the second node;

a second transistor including a gate configured to receive the first gate signal, a first terminal connected to a data line, and a second terminal connected to the first node;

a light-emitting element including an anode electrode, and a cathode electrode configured to receive a second power supply voltage;

a third transistor including a gate configured to receive the first emission signal, a first terminal connected to the second node, and a second terminal connected to the anode electrode; and a sixth transistor including a gate configured to receive the second emission signal, a first terminal configured to receive the first power supply voltage, and a second terminal connected to the first terminal of the first transistor, wherein the third transistor and the sixth transistor are different types of transistors, wherein, when the mode signal indicates a first mode, the third transistor is turned off while the data voltage is applied to the first node through the data line and the second transistor, and wherein, when the mode signal indicates a second mode, the third transistor is turned on while the data voltage is applied to the first node through the data line and the second transistor.

20. An electronic device comprising:

a processor configured to provide input image data and a mode signal; and a display device including a plurality of pixels, the display device configured to receive the input image data and the mode signal, and to drive the plurality of pixels based on the input image data and the mode signal, wherein each of the plurality of pixels comprises:

a first transistor including a first gate connected to a first node, a first terminal configured to receive a first power supply voltage, and a second terminal connected to a second node;

a first capacitor including a first electrode connected to the first node, and a second electrode connected to the second node;

a second capacitor including a first electrode configured to receive the first power supply voltage, and a second electrode connected to the second node;

a second transistor including a gate configured to receive a first gate signal, a first terminal connected to a data line, and a second terminal connected to the first node;

a light-emitting element including an anode electrode, and a cathode electrode configured to receive a second power supply voltage;

a third transistor including a gate configured to receive a first emission signal, a first terminal connected to the second node, and a second terminal connected to the anode electrode; and a sixth transistor including a gate configured to receive a second emission signal, a first terminal configured to receive the first power supply voltage, and a second terminal connected to the first terminal of the first transistor, wherein the third transistor and the sixth transistor are different types of transistors, wherein, when the mode signal indicates a first mode, the third transistor is turned off while the data voltage is applied to the first node through the data line and the second transistor, and wherein, when the mode signal indicates a second mode, the third transistor is turned on while the data voltage is applied to the first node through the data line and the second transistor.

* * * * *